(12) United States Patent
Nakata et al.

(10) Patent No.: US 7,821,910 B2
(45) Date of Patent: Oct. 26, 2010

(54) OPTICAL DISC, OPTICAL DISC DRIVE, OPTICAL DISC RECORDING/REPRODUCING METHOD, AND INTEGRATED CIRCUIT

(75) Inventors: Kohei Nakata, Nara (JP); Harumitsu Miyashita, Nara (JP)

(73) Assignee: Panasonic Corporation, Osaka (JP)

( * ) Notice: Subject to any disclaimer, the term of this patent is extended or adjusted under 35 U.S.C. 154(b) by 149 days.

(21) Appl. No.: 12/273,674

(22) Filed: Nov. 19, 2008

(65) Prior Publication Data

US 2009/0175155 A1 Jul. 9, 2009

(30) Foreign Application Priority Data

| Nov. 20, 2007 | (JP) | 2007-300135 |
| Jul. 4, 2008 | (JP) | 2008-175423 |
| Nov. 12, 2008 | (JP) | 2008-290292 |

(51) Int. Cl.
G11B 7/24 (2006.01)

(52) U.S. Cl. .............. 369/275.3; 369/275.4; 369/47.22; 369/59.25

(58) Field of Classification Search .............. 369/275.3, 369/275.4, 47.22, 47.27, 53.17, 59.22, 52.1, 369/112.24, 47.35, 59.25, 59.23
See application file for complete search history.

(56) References Cited

U.S. PATENT DOCUMENTS

| 5,719,843 | A | 2/1998 | Nakajima et al. | |
| 7,518,971 | B2 * | 4/2009 | Gushima et al. | 369/59.25 |
| 2002/0191456 | A1 | 12/2002 | Ando et al. | |
| 2003/0090971 | A1 | 5/2003 | Gushima et al. | |
| 2006/0023601 | A1 | 2/2006 | Tachino et al. | |
| 2006/0077829 | A1 | 4/2006 | Kadokawa | |
| 2006/0210243 | A1 | 9/2006 | Park | |

FOREIGN PATENT DOCUMENTS

| JP | 9-289457 | 11/1997 |
| JP | 2002/373472 | 12/2002 |
| JP | 2003-533839 | 11/2003 |
| JP | 2004-30848 | 1/2004 |
| JP | 2004-362776 | 12/2004 |
| JP | 2005-78745 | 3/2005 |
| WO | 01/88908 | 11/2001 |
| WO | 2006/098567 | 9/2006 |

OTHER PUBLICATIONS

International Search Report for corresponding application No. PCT/JP2008/003413 issued Feb. 17, 2009.

(Continued)

Primary Examiner—Ali Neyzari
(74) Attorney, Agent, or Firm—Renner, Otto, Boisselle & Sklar, LLP

(57) ABSTRACT

A big pattern for a run-in area which allows data reproduction to be performed stably even when the recording density of an optical disc is increased is provided. An optical disc according to the present invention includes tracks, each of which divided into a plurality of recording blocks. Each of the plurality of blocks includes a run-in area and a data area. In the run-in area, a prescribed run-in bit pattern is recordable; and in the data area, bit patterns having a plurality of bit lengths obtained by modulating data as a recording target in accordance with a prescribed modulation rule are recordable. In this optical disc, at least one of spatial frequencies corresponding to the bit patterns having the plurality of bit lengths is higher than a cutoff frequency. The run-in bit pattern recordable in the run-in area includes the bit patterns having the plurality of bit lengths, from which the bit pattern corresponding to the frequency higher than the OTF cutoff frequency has been excluded.

1 Claim, 21 Drawing Sheets

OTHER PUBLICATIONS

Form PCT/ISA/237 and a partial English translation.
Blu-ray Disc Reader (Blu-ray Handbook), published by Ohmsha, Ltd., pp. 13-15 and 134-139 (cited in line 9, p. 95 of the specification) with a concise explanation.
White paper, Blu-ray Disc Format, General, Aug. 2004, pp. 1-37 (cited in line 10, p. 95 of the specification).
White paper, Blu-ray Disc Format, 3, File System Specifications for BD-RE, R, ROM, Aug. 2004, pp. 1-6 (cited in line 10, p. 95 of the specification).
White paper, Blu-ray Disc Format, 4,Key Technologies, Aug. 2004, pp. 1-8 (cited in line 10, p. 95 of the specification).

* cited by examiner

FIG.10

| No | PATTERN COMBINATIONS HAVING A LENGTH OF 20T | | | | | |
|---|---|---|---|---|---|---|
| 20T-01 | 3T | 3T | 3T | 3T | 3T | 5T |
| 20T-02 | 3T | 3T | 3T | 3T | 8T | |
| 20T-03 | 3T | 3T | 3T | 4T | 7T | |
| 20T-04 | 3T | 3T | 3T | 5T | 6T | |
| 20T-05 | 3T | 3T | 4T | 4T | 6T | |
| 20T-06 | 3T | 3T | 4T | 5T | 5T | |
| 20T-07 | 3T | 3T | 6T | 8T | | |
| 20T-08 | 3T | 3T | 7T | 7T | | |
| 20T-09 | 3T | 4T | 4T | 4T | 5T | |
| 20T-10 | 3T | 4T | 5T | 8T | | |
| 20T-11 | 3T | 4T | 6T | 7T | | |
| 20T-12 | 3T | 5T | 5T | 7T | | |
| 20T-13 | 3T | 5T | 6T | 6T | | |

FIG.11

| No | PATTERN COMBINATIONS HAVING A LENGTH OF 22T | | | | | |
|---|---|---|---|---|---|---|
| 22T-01 | 3T | 3T | 3T | 3T | 3T | 7T |
| 22T-02 | 3T | 3T | 3T | 3T | 4T | 6T |
| 22T-03 | 3T | 3T | 3T | 3T | 5T | 5T |
| 22T-04 | 3T | 3T | 3T | 4T | 4T | 5T |
| 22T-05 | 3T | 3T | 3T | 5T | 8T | |
| 22T-06 | 3T | 3T | 3T | 6T | 7T | |
| 22T-07 | 3T | 3T | 4T | 4T | 8T | |
| 22T-08 | 3T | 3T | 4T | 5T | 7T | |
| 22T-09 | 3T | 3T | 4T | 6T | 6T | |
| 22T-10 | 3T | 3T | 5T | 5T | 6T | |
| 22T-11 | 3T | 3T | 8T | 8T | | |
| 22T-12 | 3T | 4T | 4T | 4T | 7T | |
| 22T-13 | 3T | 4T | 4T | 5T | 6T | |
| 22T-14 | 3T | 4T | 5T | 5T | 5T | |
| 22T-15 | 3T | 4T | 7T | 8T | | |
| 22T-16 | 3T | 5T | 6T | 8T | | |
| 22T-17 | 3T | 5T | 7T | 7T | | |
| 22T-18 | 3T | 6T | 6T | 7T | | |

FIG.12

| No | PATTERN COMBINATIONS HAVING A LENGTH OF 30T | | | | | | | |
|---|---|---|---|---|---|---|---|---|
| 30T-01 | 3T | 3T | 3T | 3T | 3T | 3T | 3T | 6T |
| 30T-02 | 3T | 3T | 3T | 3T | 3T | 3T | 4T | 5T |
| 30T-03 | 3T | 3T | 3T | 3T | 3T | 3T | 4T | 8T |
| 30T-04 | 3T | 3T | 3T | 3T | 3T | 3T | 5T | 7T |
| 30T-05 | 3T | 3T | 3T | 3T | 3T | 3T | 6T | 6T |
| 30T-06 | 3T | 3T | 3T | 3T | 3T | 4T | 4T | 7T |
| 30T-07 | 3T | 3T | 3T | 3T | 3T | 4T | 5T | 6T |
| 30T-08 | 3T | 3T | 3T | 3T | 3T | 5T | 5T | 5T |
| 30T-09 | 3T | 3T | 3T | 3T | 3T | 7T | 8T | |
| 30T-10 | 3T | 3T | 3T | 3T | 4T | 4T | 4T | 6T |
| 30T-11 | 3T | 3T | 3T | 3T | 4T | 4T | 5T | 5T |
| 30T-12 | 3T | 3T | 3T | 3T | 4T | 6T | 8T | |
| 30T-13 | 3T | 3T | 3T | 3T | 4T | 7T | 7T | |
| 30T-14 | 3T | 3T | 3T | 3T | 5T | 5T | 8T | |
| 30T-15 | 3T | 3T | 3T | 3T | 5T | 6T | 7T | |
| 30T-16 | 3T | 3T | 3T | 3T | 6T | 6T | 6T | |
| 30T-17 | 3T | 3T | 3T | 4T | 4T | 4T | 4T | 5T |
| 30T-18 | 3T | 3T | 3T | 4T | 4T | 5T | 8T | |
| 30T-19 | 3T | 3T | 3T | 4T | 4T | 6T | 7T | |
| 30T-20 | 3T | 3T | 3T | 4T | 5T | 5T | 7T | |
| 30T-21 | 3T | 3T | 3T | 4T | 5T | 6T | 6T | |
| 30T-22 | 3T | 3T | 3T | 5T | 5T | 5T | 6T | |
| 30T-23 | 3T | 3T | 3T | 5T | 8T | 8T | | |
| 30T-24 | 3T | 3T | 3T | 6T | 7T | 8T | | |
| 30T-25 | 3T | 3T | 3T | 7T | 7T | 7T | | |
| 30T-26 | 3T | 3T | 4T | 4T | 4T | 4T | 8T | |
| 30T-27 | 3T | 3T | 4T | 4T | 4T | 5T | 7T | |
| 30T-28 | 3T | 3T | 4T | 4T | 4T | 6T | 6T | |
| 30T-29 | 3T | 3T | 4T | 4T | 5T | 5T | 6T | |
| 30T-30 | 3T | 3T | 4T | 4T | 8T | 8T | | |

FIG.13

| No | PATTERN COMBINATIONS HAVING A LENGTH OF 30T | | | | | | | |
|---|---|---|---|---|---|---|---|---|
| 30T-31 | 3T | 3T | 4T | 5T | 5T | 5T | 5T | |
| 30T-32 | 3T | 3T | 4T | 5T | 7T | 8T | | |
| 30T-33 | 3T | 3T | 4T | 6T | 6T | 8T | | |
| 30T-34 | 3T | 3T | 4T | 6T | 7T | 7T | | |
| 30T-35 | 3T | 3T | 5T | 5T | 6T | 8T | | |
| 30T-36 | 3T | 3T | 5T | 5T | 7T | 7T | | |
| 30T-37 | 3T | 3T | 5T | 6T | 7T | 7T | | |
| 30T-38 | 3T | 3T | 6T | 6T | 6T | 6T | | |
| 30T-39 | 3T | 3T | 8T | 8T | 8T | | | |
| 30T-40 | 3T | 4T | 4T | 4T | 4T | 4T | 7T | |
| 30T-41 | 3T | 4T | 4T | 4T | 4T | 5T | 6T | |
| 30T-42 | 3T | 4T | 4T | 4T | 5T | 5T | 5T | |
| 30T-43 | 3T | 4T | 4T | 4T | 7T | 8T | | |
| 30T-44 | 3T | 4T | 4T | 5T | 6T | 8T | | |
| 30T-45 | 3T | 4T | 4T | 5T | 7T | 7T | | |
| 30T-46 | 3T | 4T | 4T | 6T | 6T | 7T | | |
| 30T-47 | 3T | 4T | 5T | 5T | 5T | 8T | | |
| 30T-48 | 3T | 4T | 5T | 5T | 6T | 7T | | |
| 30T-49 | 3T | 4T | 5T | 6T | 6T | 6T | | |
| 30T-50 | 3T | 4T | 7T | 8T | 8T | | | |
| 30T-51 | 3T | 5T | 5T | 5T | 7T | | | |
| 30T-52 | 3T | 5T | 5T | 5T | 6T | 6T | | |
| 30T-53 | 3T | 5T | 6T | 8T | 8T | | | |
| 30T-54 | 3T | 5T | 7T | 7T | 8T | | | |
| 30T-55 | 3T | 6T | 6T | 7T | 8T | | | |
| 30T-56 | 3T | 6T | 7T | 7T | 7T | | | |

FIG. 14
(A) CONVENTIONAL RECORDING DENSITY
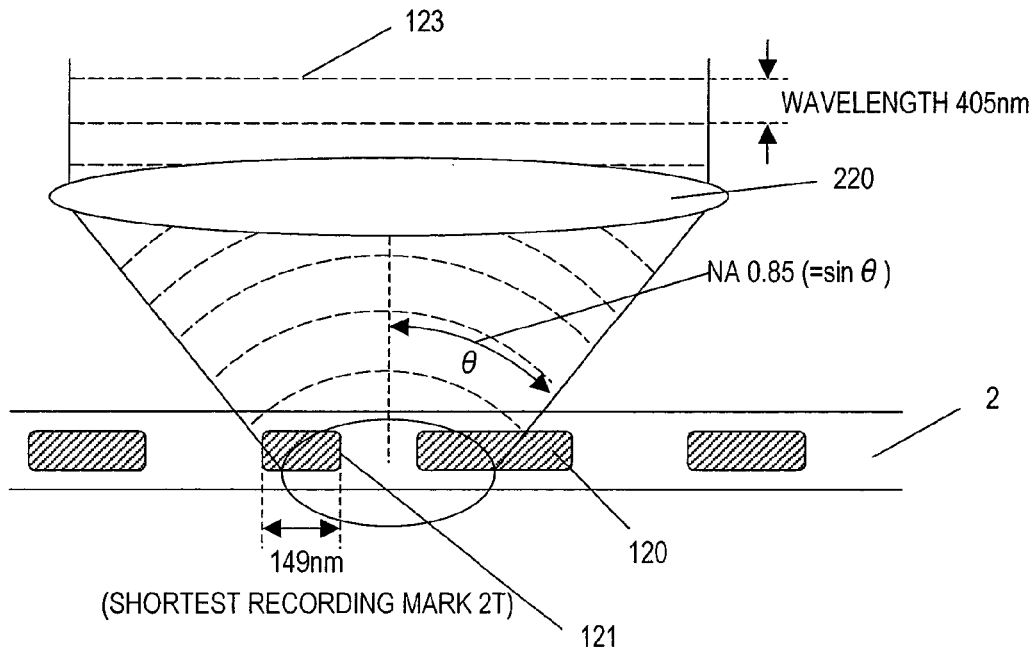
(B) HIGH RECORDING DENSITY
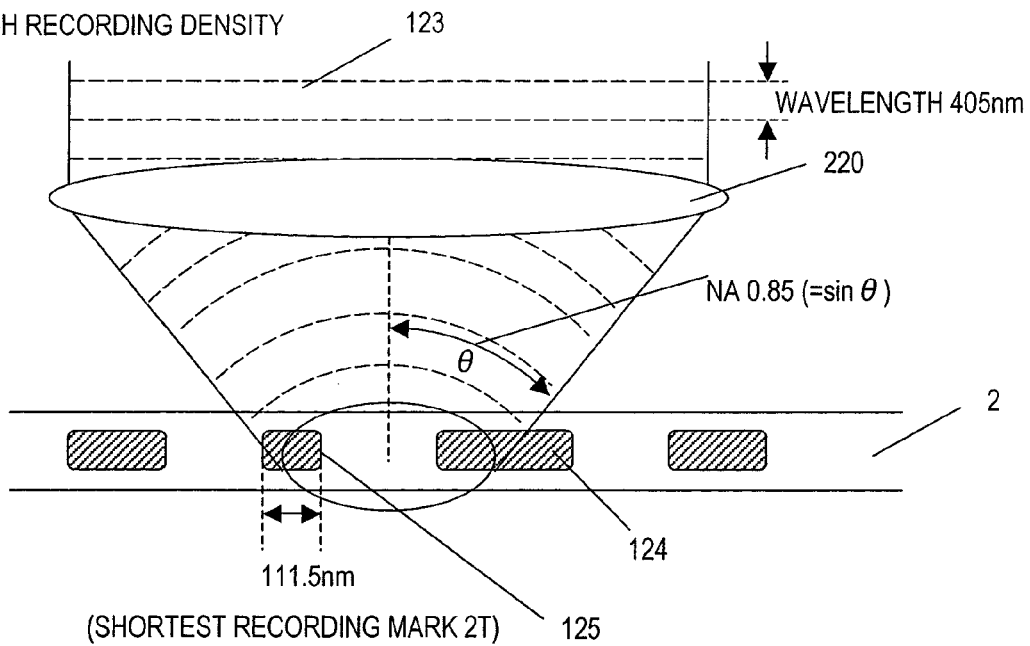

OPTICAL DISC, OPTICAL DISC DRIVE, OPTICAL DISC RECORDING/REPRODUCING METHOD, AND INTEGRATED CIRCUIT

BACKGROUND OF THE INVENTION

1. Field of the Invention

The present invention relates to a recording format usable for recording information on an information recording medium, and a technology for recording or reproducing information in accordance with the recording format.

2. Description of the Related Art

Recently, research and development of high density optical discs has been actively conducted. Currently, for example, Blu-ray Disc (BD) has been proposed and put into practice, and is used for recording digital broadcast or the like. Optical discs are now establishing their position as an important information medium (see "Zukai Blu-ray Disc Dokuhon" (Blu-ray Handbook with Diagrams) published by Ohmsha, Ltd.). For further increasing the density, research and development is being performed for providing a recording density higher than that of the BD to expand the recording capacity.

FIG. 17 shows an example of a conventional recording format. Recording data is recorded in units of blocks obtained by performing error correction coding processing at every prescribed data amount. A block includes a run-in area used for synchronization detection during reproduction provided at the start thereof, and a data area including the recording data. The data area is divided into a plurality of sectors, and each sector is further divided into a plurality of frames. At the start of each frame, a frame synchronization pattern including a prescribed bit pattern and a synchronization ID pattern unique to the respective frame is located. After the frame synchronization pattern, a bit pattern obtained by modulating the recording data in accordance with a prescribed modulation rule is recorded.

For the BD practically used today, the 1-7 modulation code is adopted, and the shortest bit length is 2T. The spatial frequency of 2T is close to the limit of the optical resolving power and corresponds to 80% with respect to the cutoff frequency of the optical transfer function (OTF) of the BD. Where the maximum amplitude detectable for various bit lengths is 100%, the amplitude of the reproduction signal of 2T is as small as 10% thereof.

FIG. 18 shows the relationship between the optical resolving power of the BD and the shortest bit length 2T. When the shortest bit length is close to the OTF cutoff frequency, proximate recording marks or even proximate spaces are encompassed in the optical spot. Therefore, the amplitude of the reproduction signal is reduced and also the waveform is distorted by the inter-code interference. Against such amplitude reduction and waveform distortion, the data detection precision is conventionally improved by using a PRML (Partial Response Maximum Likelihood) technology using an adaptive equalization technology and a maximum likelihood decoding technology such as Viterbi decoding.

FIG. 19 shows a structure of a conventional optical disc apparatus 1100. The optical disc apparatus 1100 includes an optical head 1001, a motor 1002, a servo circuit 1003, an address reproducing circuit 1004, a CPU 1005, a run-in generation circuit 1006, a data modulation circuit 1007, a recording control circuit 1008, a data signal extraction circuit 1009, a reproduction clock generation PLL circuit 1010, an adaptive equalization circuit 1011, and a data demodulation circuit 1012. In the figure, an optical disc 1000 on which data is recordable in a reproduceable format is shown.

The optical head 1001 irradiates the optical disc 1000 with a light beam for performing data recording or data reproduction. The motor 1002 rotates the optical disc 1000 at a prescribed rotation rate.

Based on a reproduction signal obtained from the optical head 1001, the servo circuit 1003 appropriately controls the position of the optical head 1001 for outputting the light beam and the rotation rate of the motor 1002.

The address reproducing circuit 1004 reproduces address information pre-recorded on a track of the optical disc 1000, which is included in the detected reproduction signal.

The CPU 1005 controls the entire apparatus.

The run-in generation circuit 1006 generates a bit pattern for the run-in area.

The data modulation circuit 1007 generates a bit pattern obtained by performing error correction coding processing and modulation on recording data.

The recording control circuit 1008 controls the intensity of the light beam from the optical head 1001 such that the run-in bit pattern and the bit pattern of the recording data are recorded on a block at a specified address.

The data signal extraction circuit 1009 extracts a data signal based on the recording data from the reproduction signal.

The reproduction clock generation PLL circuit 1010 generates a reproduction clock bit-synchronized to the extracted data signal.

The adaptive equalization circuit 1011 appropriately binarizes the data signal including amplitude reduction or wave distortion by the PRML technology.

The data demodulation circuit 1012 performs demodulation and error correction processing on the binarized data signal in accordance with a prescribed modulation rule to obtain reproduction data.

In order to effectively use the PRML technology in the adaptive equalization circuit 1011, a reproduction clock signal acting as the reference for the operation timing of the adaptive equalization circuit 1011 is required, and also the adaptive equalization circuit 1011 needs to perform adaptive locking control.

A reproduction clock signal is a clock signal synchronized to the bit length of a data signal, and is generated by the reproduction clock generation PLL circuit 1010 which receives the data signal as an input signal. In order to generate a stable reproduction clock signal, it is usually appropriate that the response characteristic of the reproduction clock generation PLL circuit 1010 is set to a frequency which is about one several hundredths to one several tenths of an average spatial frequency of a data signal.

In the meantime, data in the vicinity of the outermost end of the optical disc 1000 may be reproduced by changing the position of the optical disc 1000 to be irradiated with the light beam from the state where data in the vicinity of the innermost end of the optical disc 1000 is being reproduced. For performing such reproduction, it is required to detect the synchronization position with respect to the data signal within a short time. This is required in order not to spoil the accessibility to the data on the optical disc 1000 in the situation where the frequency of the bit length is significantly varied in accordance with the rotation rate of the motor 1002 for rotating the optical disc 1000 or in accordance with the radial position on the optical disc 1000 of the data to be reproduced. For realizing this, the reproduction clock generation PLL circuit 1010 needs to have a capability of locking the frequency and the phase within a short time.

According to the conventional technology, in order to fulfill such a requirement by providing both the stability and the locking capability of the reproduction clock generation PLL circuit 1010 during data reproduction, a run-in area for allowing the reproduction clock generation PLL circuit 1010 to efficiently perform the locking is provided at every prescribed block. As a bit pattern for the run-in area, a single bit pattern shown in, for example, FIG. 17(A) is adopted. In this pattern, the same length bits of 4T marks and 4T spaces are continued. Since such a simple bit pattern is known in advance, a frequency error or a phase error can be easily detected and so the reproduction clock generation PLL circuit 1010 can perform the locking stably in a short time.

The adaptive equalization circuit 1011 (FIG. 19) includes an equalization filtering circuit, an adaptive control circuit for controlling a filter coefficient of the equalization filtering circuit, and a Viterbi decoding circuit for binarizing an output from the equalization filtering circuit (none of these is shown).

The adaptive control circuit adaptively controls the filter coefficient of the equalization filtering circuit, such that the signal amplitude or the wave distortion state of the data signal processed by the equalization filtering circuit reaches a target amplitude pre-specified for each bit length, namely, such that the frequency characteristic of the data signal is close to the pre-specified frequency characteristic. The signal amplitude or the wave distortion state of the data signal mainly varies depending on the recording conditions, and therefore it is appropriate that the response characteristic of the adaptive control circuit for controlling the filter coefficient is set to be sufficiently low. The adaptive control circuit is effective for a zone in which the sufficient locking control has been completed, but is not effective for a zone in which the locking control has not been completed. In such a zone, a bit error is likely to occur during the data is decoded by the Viterbi decoding circuit. Therefore, like the above-described reproduction clock generation PLL circuit 1010, the adaptive control circuit needs to perform the locking control within a short time, such that when the position on the track of the optical disc 1000 at which the data is to be reproduced is changed, a stable data reduction state is realized within a short time.

Conventionally, in order to fulfill such a requirement, the following bit pattern is used as the bit pattern for the run-in area: a bit pattern by which all the pre-specified target amplitudes are present, in order to allow the adaptive equalization circuit 1011 to perform the adaptive locking; and further a simple fixed bit pattern in order to allow, with certainty, the reproduction clock generation PLL circuit 1010 to perform the locking.

FIG. 20 shows an ideal signal amplitude of each of signal waveforms of 2T through 9T and synchronization sampling points by an ideal reproduction clock signal, where the optical transfer function (OTF) is as shown in FIG. 18 and appropriate equalization processing has been performed. In the example shown here, as shown in FIG. 17(B), the following three bit lengths are used: the shortest bit length 2T at which the reproduction signal amplitude is minimum, 3T at which the reproduction signal amplitude is at a medium level, 6T at which the reproduction signal amplitude is maximum. These three bit lengths are used in order to allow all the target amplitudes to be present. Furthermore, as a simple fixed bit pattern, a bit pattern having a length of 22T in total including 2T mark/2T space/3T mark/3T space/6T mark/6T space is used, for example.

FIG. 21 shows an ideal signal waveform of a data signal of a repeat unit of 2T mark/2T space/3T mark/3T space/6T mark/6T space and synchronization sampling points by an ideal reproduction clock signal. Owing to this, the reproduction clock generation PLL circuit 1010 can perform the locking and the adaptive equalization circuit 1011 can perform the adaptive locking control both in the run-in area, and so the data recorded after the run-in area can be stably reproduced.

Recently, in order to respond to the demand for a significantly enlarged recording capacity, studies are being made on optical discs having a higher recording density than that of the conventional BD. It has been found that when the length of the recording marks and the inter-mark distances are decreased to obtain a larger recording capacity than the conventional recording capacity, the spatial frequency of the shortest bit length 2T becomes higher than the OTF cutoff frequency and as a result, the amplitude of a 2T reproduction signal becomes 0%. For example, FIG. 22 shows an example in which the spatial frequency of 2T is higher than the OTF cutoff frequency and the amplitude of a 2T reproduction signal is 0.

As seen from this example, when the bit pattern of a conventional run-in area is used as it is for an optical disc having a higher density than the conventional recording density, the following problem arises. The waveform of a data signal corresponding to marks/spaces having a length of 2T or a length close to 2T is largely distorted and so an accurate bit border position cannot be obtained. As a result, the locking by the reproduction clock generation PLL circuit 1010 and the locking by the adaptive equalization circuit 1011 cannot be stably performed.

FIG. 23 shows an ideal signal amplitude of each of signal waveforms of 2T through 9T and synchronization sampling points by an ideal reproduction clock signal, where the optical transfer function (OTF) is as shown in FIG. 22 and appropriate equalization processing has been performed. The amplitude of each signal of 3T or longer is identifiably obtained, but the signal amplitude of 2T is zero and is not identifiable. FIG. 24 shows an ideal signal waveform of a data signal of a repeat unit of 2T mark/2T space/3T mark/3T space/6T mark/6T space and synchronization sampling points by an ideal reproduction clock signal in such a case. It is seen that because the signal amplitude of 2T is zero, the mark/space bit border can be accurately obtained only at the border between the 3T mark and the 3T space, the border between the 3T space and the 6T mark, and the border between the 6T mark and the 6T space. In the case where the 2T mark and the 2T space are not ideally recorded, the waveforms of 3T and 6T adjacent to 2T are largely distorted. Influenced by this, the border between the 3T mark and the 3T space and the border between the 6T mark and the 6T space are shifted and cannot be accurately obtained. In a worst case, neither the reproduction clock generation PLL circuit 1010 nor the adaptive equalization circuit 1011 can perform the locking, and the data becomes unreproduceable.

The bit pattern of the conventional run-in area is a repetition of a simple fixed pattern. Therefore, there is another problem that the synchronization for demodulating the data cannot be realized by the data demodulation circuit 1012 and data errors are continued in many consecutive zones. This may occur in the following case. An accurate position in the run-in area cannot be specified, and so the locking by the reproduction clock generation PLL circuit 1010 and the locking by the adaptive equalization circuit 1011 are insufficient. As a result, the frame synchronization pattern of frame 0 which represents the start of data recorded after the run-in area cannot be detected.

SUMMARY OF THE INVENTION

The present invention made in light of the above-described problems has an object of providing an optical disc having a bit pattern in a run-in area, which allows a reproduction clock generation PLL circuit and an adaptive equalization circuit to perform stable locking even when the frequency corresponding to the shortest bit length is higher than the OTF cutoff frequency, and which prevents the generation of continuous data errors even when the locking by the reproduction clock generation PLL circuit or the locking by the adaptive equalization circuit is insufficient. Another object of the present invention is to provide an optical disc reproducing apparatus and an optical disc recording apparatus using such a bit pattern in the run-in area.

An optical disc according to the present invention comprises tracks, each divided into a plurality of recording blocks; each of the plurality of blocks includes a run-in area and a data area; in the run-in area, a prescribed run-in bit pattern is recordable; in the data area, bit patterns having a plurality of bit lengths obtained by modulating data as a recording target in accordance with a prescribed modulation rule are recordable; at least one of spatial frequencies corresponding to the bit patterns having the plurality of bit lengths in accordance with the prescribed modulation rule is higher than a cutoff frequency; the cutoff frequency is defined as a frequency at which a gain of an optical transfer function (OTF) is 0 times; and the run-in bit pattern recordable in the run-in area includes the bit patterns having the plurality of bit lengths, from which the bit pattern corresponding to the frequency higher than the OTF cutoff frequency has been excluded.

The run-in bit pattern may include the bit patterns having the plurality of bit lengths, from which the bit pattern corresponding to the frequency higher than the OTF cutoff frequency has been excluded, and which have a bit length equal to or shorter than a bit length at which a reproduction signal of the run-in bit pattern, obtained from reflected light when the optical disc is irradiated with a prescribed light beam, has a maximum signal amplitude.

The run-in bit pattern may include both a combination of bit patterns having a bit length difference of nT or smaller and a combination of bit patterns having a bit length difference of (n+1) or larger, where n is a natural number.

In the run-in bit pattern, a part having a prescribed length from a start of the run-in area may include a pattern in which short bit lengths appear at a higher frequency than in a part immediately after the end of the prescribed length.

An optical disc according to the present invention comprises a track divided into a plurality of recording blocks; each of the plurality of blocks includes a run-in area and a data area; in the run-in area, a prescribed run-in bit pattern is recordable; in the data area, bit patterns having a plurality of bit lengths obtained by modulating data as a recording target in accordance with a prescribed modulation rule are recordable; where the shortest mark among the bit patterns having the plurality of bit lengths has a length of TM nm, the shortest space among the bit patterns having the plurality of bit lengths has a length of TS nm, laser light used for irradiating the track has a wavelength of $\lambda$ nm, and an objective lens for collecting the laser light has a numerical aperture NA, TM+TS<$\lambda$/(2×NA) is fulfilled; and the run-in bit pattern recordable in the run-in area includes the bit patterns having the plurality of bit lengths, from which a bit pattern having a bit length equal to or shorter than $\lambda/(2\times NA)/2$ has been excluded.

The length $\lambda$ of the laser light used for irradiating the track may be 400 to 410 nm.

The numerical aperture NA of the objective lens may be 0.84 to 0.86.

A total length TM+TS of the length of the shortest mark and the length of the shortest space may be shorter than 238.2 nm (405/(2×0.85)).

The data as the recording target may be modulated by 1-7 modulation rule, the length of the shortest mark may be 2T and the length of the shortest space may be 2T.

A reproducing method according to the present invention is for reproducing data recorded on the above-described optical disc. The reproducing method comprises the steps of detecting a reproduction signal obtained by reproducing a bit pattern recorded on the track of the optical disc; generating a clock signal phase-synchronized to bits of the reproduction signal; outputting a binary signal obtained by performing adaptive equalization and then binarization on the reproduction signal; and demodulating the binary signal in accordance with a prescribed modulation rule in the data area, thereby extracting recording data. The step of generating the clock signal performs locking control for phase synchronization on the reproduction signal and the clock signal in the run-in area at a higher gain than in the data area. The step of outputting the binary signal performs locking control for adaptive equalization in the run-in area at a higher gain than in the data area.

A reproducing method according to the present invention is for reproducing data recorded on the above-described optical disc. The reproducing method comprises the steps of detecting a reproduction signal obtained by reproducing a bit pattern recorded on the track of the optical disc; generating a clock signal phase-synchronized to bits of the reproduction signal; outputting a binary signal obtained by performing adaptive equalization and then binarization on the reproduction signal; and demodulating the binary signal in accordance with the prescribed modulation rule in the data area, thereby extracting recording data. The step of generating the clock signal performs locking control for phase synchronization on the reproduction signal and the clock signal in the run-in area at a higher gain than in the data area. The step of outputting the binary signal performs locking control for adaptive equalization in the run-in area at a higher gain than in the data area.

An optical disc recording method according to the present invention is for recording data on the above-described optical disc. The optical disc recording method comprises the steps of generating the run-in bit pattern; generating a data bit pattern obtained by modulating data as the recording target in accordance with a prescribed modulation rule and then inserting a prescribed frame synchronization pattern at every prescribed frame length; and recording the run-in bit pattern in the run-in area, and recording the data bit pattern in the data area, of each of the recording blocks of the optical disc. The run-in bit pattern includes the bit patterns having the plurality of bit lengths, from which a bit pattern corresponding to a frequency higher than the OTF cutoff frequency has been excluded.

An optical disc recording method according to the present invention is for recording data on the above-described optical disc. The optical disc recording method comprises the steps of generating the run-in bit pattern; generating a data bit pattern obtained by modulating data as the recording target in accordance with a prescribed modulation rule and then inserting a prescribed frame synchronization pattern at every prescribed frame length; and recording the run-in bit pattern in the run-in area, and recording the data bit pattern in the data area, of each of the recording blocks of the optical disc. The run-in bit pattern includes the bit patterns having the plurality of bit lengths, from which a bit pattern corresponding to a frequency higher than the OTF cutoff frequency has been excluded.

An optical disc according to the present invention comprises tracks, each divided into a plurality of recording blocks; each of the plurality of blocks includes a run-in area and a data area; in the run-in area, a prescribed run-in bit pattern is recorded; and in the data area, a bit pattern, obtained by modulating recording data in accordance with a prescribed modulation rule and then inserting a prescribed frame synchronization pattern at every prescribed frame length, is recorded. The run-in bit pattern recorded in the run-in area includes a run-in synchronization pattern which includes a bit pattern longer than the longest bit length included in the bit pattern recorded in the data area and a bit pattern longer than the bit length of the frame synchronization pattern.

The run-in bit pattern may include a plurality of the run-in synchronization patterns, and the plurality of the run-in synchronization patterns are different bit patterns from each other.

A reproducing method according to the present invention is for reproducing the recording data from the above-described optical disc. The reproducing method comprises the steps of detecting a reproduction signal obtained by reproducing a bit pattern recorded on the track of the optical disc; outputting a binary signal obtained by binarizing the reproduction signal; detecting a run-in synchronization pattern included in the run-in area from the binary signal; detecting a frame synchronization pattern included in the data area from the binary signal; and demodulating the binary signal in accordance with the prescribed modulation rule in the data area, thereby extracting the recording data. In the case where the run-in synchronization pattern is detected by the run-in synchronization detection step in the run-in area of each of the recording blocks but the frame synchronization pattern is undetectable by the frame synchronization detection step in the vicinity of the start of the data area following the run-in area, the step of extracting the recording data performs demodulation processing on the data area based on a timing at which the run-in synchronization pattern is detected by the run-in synchronization detection step.

A recording method according to the present invention is for recording the recording data on the above-described optical disc. The recording method comprises the steps of generating the run-in bit pattern; generating a data bit pattern obtained by modulating the recording data in accordance with a prescribed modulation rule and then inserting a prescribed frame synchronization pattern at every prescribed frame length; and recording the run-in bit pattern in the run-in area, and recording the data bit pattern in the data area, of each of the recording blocks of the optical disc. The run-in bit pattern includes a run-in synchronization pattern which includes a bit pattern longer than the longest bit length included in the bit pattern recorded in the data area and a bit pattern longer than the bit length of the frame synchronization pattern.

In addition, in order to solve the above-described problems, an optical disc according to the present invention comprises a track divided into a plurality of recording blocks; each of the plurality of blocks includes a run-in area and a data area; in the run-in area, a prescribed run-in bit pattern is recorded; and in the data area, a bit pattern, obtained by modulating recording data in accordance with a prescribed modulation rule and then inserting a prescribed frame synchronization pattern at every prescribed frame length, is recorded. The run-in bit pattern recorded in the run-in area includes a run-in synchronization pattern which includes a bit pattern which is longer than the longest bit length included in the bit pattern recorded in the data area and a bit pattern longer than the bit length of the frame synchronization pattern.

The run-in bit pattern may include a plurality of the run-in synchronization patterns, and the plurality of the run-in synchronization patterns may be different bit patterns from each other.

An optical disc according to the present invention comprises a track divided into a plurality of recording blocks; each of the plurality of blocks includes a run-in area and a data area; in the run-in area, a prescribed run-in bit pattern is recorded; in the data area, bit patterns obtained by modulating recording data in accordance with a prescribed modulation rule are recorded; the spatial frequency corresponding to the shortest of the bit patterns in accordance with the prescribed modulation rule is higher than the cutoff frequency at which the OTF gain is 0 times; and the run-in bit pattern recorded in the run-in area includes the bit patterns generated by the prescribed modulation rule, from which the bit pattern having a bit length corresponding to the frequency higher than the OTF cutoff frequency has been excluded.

The run-in bit pattern may include the bit patterns generated by the prescribed modulation rule, from which the bit pattern having a bit length corresponding to the frequency higher than the OTF cutoff frequency has been excluded, and which have a bit length equal to or shorter than a bit length corresponding to a spatial frequency at which the OTF gain is maximum.

The run-in bit pattern may include both a combination of bit patterns having a small bit length difference and a combination of bit patterns having a large bit length difference.

In the run-in bit pattern, a first half may include a pattern in which short bit lengths appear at a high frequency.

An optical disc reproducing apparatus according to the present invention is for reproducing recording data from an optical disc comprising a track divided into a plurality of recording blocks; wherein each of the plurality of blocks includes a run-in area and a data area; in the run-in area, a prescribed run-in bit pattern is recorded; in the data area, a bit pattern, obtained by modulating the recording data in accordance with a prescribed modulation rule and then inserting a prescribed frame synchronization pattern at every prescribed frame length, is recorded; and the run-in bit pattern recorded in the run-in area includes a run-in synchronization pattern which includes a bit pattern which is longer than the longest bit length included in the bit pattern recorded in the data area and a bit pattern longer than the bit length of the synchronization pattern. The optical disc reproducing apparatus comprises reproduction signal detection means for detecting a reproduction signal obtained by reproducing a bit pattern recorded on the track of the optical disc; binarization means for outputting a binary signal obtained by binarizing the reproduction signal; run-in synchronization detection means for detecting a run-in synchronization pattern included in the run-in area from the binary signal; frame synchronization detection means for detecting a frame synchronization pattern included in the data area from the binary signal; and demodulation means for demodulating the binary signal in accordance with the prescribed modulation rule in the data area, thereby extracting the recording data. In the case where the run-in synchronization pattern is detected by the run-in synchronization detection means in the run-in area of each of the recording blocks but the frame synchronization pattern is undetectable by the frame synchronization detection means in the vicinity of the start of the data area following the run-in area, the demodulation means performs demodulation processing on the data area based on a timing at which the run-in synchronization pattern is detected by the run-in synchronization detection means.

An optical disc reproducing apparatus according to the present invention is for reproducing recording data from an optical disc comprising a track divided into a plurality of recording blocks; wherein each of the plurality of blocks includes a run-in area and a data area; in the run-in area, a prescribed run-in bit pattern is recorded; in the data area, bit patterns obtained by modulating the recording data in accordance with a prescribed modulation rule are recorded; the spatial frequency corresponding to the shortest of the bit patterns in accordance with the prescribed modulation rule is higher than the cutoff frequency at which the OTF gain is 0 times; and the run-in bit pattern recorded in the run-in area includes the bit patterns generated by the prescribed modulation rule, from which the bit pattern having a bit length corresponding to the frequency higher than the OTF cutoff frequency has been excluded. The optical disc reproducing apparatus comprises reproduction signal detection means for detecting a reproduction signal obtained by reproducing a bit pattern recorded on the track of the optical disc; clock generation means for generating a clock signal phase-synchronized to bits of the reproduction signal; adaptive equalization means for outputting a binary signal obtained by performing adaptive equalization and then binarization on the reproduction signal; and demodulation means for demodulating the binary signal in accordance with the prescribed modulation rule in the data area, thereby extracting the recording data. The clock generation means performs locking control for phase synchronization on the reproduction signal and the clock signal in the run-in area at a higher gain than in the data area. The adaptive equalization means performs locking control for adaptive equalization in the run-in area at a higher gain than in the data area.

An optical disc recording apparatus according to the present invention is for recording data on an optical disc comprising a track divided into a plurality of recording blocks; wherein each of the plurality of blocks includes a run-in area and a data area; in the run-in area, a prescribed run-in bit pattern is recorded; and in the data area, a bit pattern, obtained by modulating the recording data in accordance with a prescribed modulation rule and then inserting a prescribed frame synchronization pattern at every prescribed frame length, is recorded. The optical disc recording apparatus comprises run-in bit pattern generation means for generating the run-in bit pattern; data bit pattern generation means for generating a data bit pattern obtained by modulating the recording data in accordance with the prescribed modulation rule and then inserting a prescribed frame synchronization pattern at every prescribed frame length; and recording means for recording the run-in bit pattern in the run-in area, and recording the data bit pattern in the data area, of each of the recording blocks of the optical disc. The run-bit pattern generated by the run-in bit pattern generation means includes a run-in synchronization pattern which includes a bit pattern longer than the longest bit length included in the data bit pattern recorded in the data area and a bit pattern longer than the bit length of the frame synchronization pattern.

An optical disc recording apparatus according to the present invention is for recording data on an optical disc comprising a track divided into a plurality of recording blocks; wherein each of the plurality of blocks includes a run-in area and a data area; in the run-in area, a prescribed run-in bit pattern is recorded; in the data area, bit patterns obtained by modulating the recording data in accordance with a prescribed modulation rule are recorded; and the spatial frequency corresponding to the shortest of the bit patterns in accordance with the prescribed modulation rule is higher than the cutoff frequency at which the OTF gain is 0 times. The optical disc recording apparatus comprises run-in bit pattern generation means for generating the run-in bit pattern; data bit pattern generation means for generating a data bit pattern obtained by modulating the recording data in accordance with the prescribed modulation rule and then inserting a prescribed frame synchronization pattern at every prescribed frame length; and recording means for recording the run-in bit pattern in the run-in area, and recording the data bit pattern in the data area, of each of the recording blocks of the optical disc. The run-in bit pattern generated by the run-in bit pattern generation means includes the bit patterns generated by the prescribed modulation rule, from which a bit pattern having a bit length corresponding to a frequency higher than the OTF cutoff frequency has been excluded.

An optical disc reproducing method according to the present invention is for reproducing recording data from an optical disc comprising a track divided into a plurality of recording blocks; wherein each of the plurality of blocks includes a run-in area and a data area; in the run-in area, a prescribed run-in bit pattern is recorded; in the data area, a bit pattern, obtained by modulating the recording data in accordance with a prescribed modulation rule and then inserting a prescribed frame synchronization pattern at every prescribed frame length, is recorded; and the run-in bit pattern recorded in the run-in area includes a run-in synchronization pattern which includes a bit pattern which is longer than the longest bit length included in the bit pattern recorded in the data area and a bit pattern longer than the bit length of the frame synchronization pattern.

The optical disc reproducing method comprises a reproduction signal detection step of detecting a reproduction signal obtained by reproducing a bit pattern recorded on the track of the optical disc; a binarization step of outputting a binary signal obtained by binarizing the reproduction signal; a run-in synchronization detection step of detecting a run-in synchronization pattern included in the run-in area from the binary signal; a frame synchronization detection step of detecting a frame synchronization pattern included in the data area from the binary signal; and a demodulation step of demodulating the binary signal in accordance with the prescribed modulation rule in the data area, thereby extracting the recording data. In the case where the run-in synchronization pattern is detected by the run-in synchronization detection step in the run-in area of each of the recording blocks but the frame synchronization pattern is undetectable by the frame synchronization detection step in the vicinity of the start of the data area following the run-in area, the demodulation step performs demodulation processing on the data area based on a timing at which the run-in synchronization pattern is detected by the run-in synchronization detection step.

An optical disc reproducing method according to the present invention is for reproducing recording data from an optical comprising a track divided into a plurality of recording blocks; wherein each of the plurality of blocks includes a run-in area and a data area; in the run-in area, a prescribed run-in bit pattern is recorded; in the data area, bit patterns obtained by modulating the recording data in accordance with a prescribed modulation rule are recorded; the spatial frequency corresponding to the shortest of the bit patterns in accordance with the prescribed modulation rule is higher than the cutoff frequency at which the OTF gain is 0 times; and the run-in bit pattern recorded in the run-in area includes the bit patterns generated by the prescribed modulation rule, from which the bit pattern having a bit length corresponding to the frequency higher than the OTF cutoff frequency has been excluded. The optical disc reproducing method comprises a reproduction signal detection step of detecting a reproduction signal obtained by reproducing a bit pattern recorded on the track of the optical disc; a clock generation step of generating a clock signal phase-synchronized to bits of the reproduction signal; an adaptive equalization step of outputting a binary signal obtained by performing adaptive equalization and then binarization on the reproduction signal; and a demodulation step of demodulating the binary signal in accordance with a prescribed modulation rule in the data area, thereby extracting the recording data. The clock generation step performs locking control for phase synchronization on the reproduction signal and the clock signal in the run-in area at a higher gain than in the data area. The adaptive equalization step performs locking control for adaptive equalization in the run-in area at a higher gain than in the data area.

An optical disc recording method according to the present invention is for recording data on an optical disc comprising a track divided into a plurality of recording blocks; wherein each of the plurality of blocks includes a run-in area and a data area; in the run-in area, a prescribed run-in bit pattern is recorded; and in the data area, a bit pattern, obtained by modulating the recording data in accordance with a prescribed modulation rule and then inserting a prescribed frame synchronization pattern at every prescribed frame length, is recorded. The optical disc recording method comprises a run-in bit pattern generation step of generating the run-in bit pattern; a data bit pattern generation step of generating a data bit pattern obtained by modulating the recording data in accordance with the prescribed modulation rule and then inserting a prescribed frame synchronization pattern at every prescribed frame length; and a recording step of recording the run-in bit pattern in the run-in area, and recording the data bit pattern in the data area, of each of the recording blocks of the optical disc. The run-in bit pattern generated by the run-in bit pattern generation step includes a run-in synchronization pattern which includes a bit pattern longer than the longest bit length included in the data bit pattern recorded in the data area and a bit pattern longer than the bit length of the frame synchronization pattern.

An optical disc recording method according to the present invention is for recording data on an optical disc comprising a track divided into a plurality of recording blocks; wherein each of the plurality of blocks includes a run-in area and a data area; in the run-in area, a prescribed run-in bit pattern is recorded; in the data area, bit patterns obtained by modulating the recording data in accordance with a prescribed modulation rule are recorded; and the spatial frequency corresponding to the shortest of the bit patterns in accordance with the prescribed modulation rule is higher than the cutoff frequency at which the OTF gain is 0 times. The optical disc recording method comprises a run-bit pattern generation step of generating the run-in bit pattern; a data bit pattern generation step of generating a data bit pattern obtained by modulating the recording data in accordance with the prescribed modulation rule and then inserting a prescribed frame synchronization pattern at every prescribed frame length; and recording step of recording the run-in bit pattern in the run-in area, and recording the data bit pattern in the data area, of each of the recording blocks of the optical disc. The run-in bit pattern generated by the run-in bit pattern generation step includes the bit patterns generated by the prescribed modulation rule, from which a bit pattern having a bit length corresponding to a frequency higher than the OTF cutoff frequency has been excluded.

An integrated circuit according to the present invention is for reproducing recording data from a reproduction signal reproduced from an optical disc comprising a track divided into a plurality of recording blocks; wherein each of the plurality of blocks includes a run-in area and a data area; in the run-in area, a prescribed run-in bit pattern is recorded; in the data area, a bit pattern, obtained by modulating the recording data in accordance with a prescribed modulation rule and then inserting a prescribed frame synchronization pattern at every prescribed frame length, is recorded; and the run-in bit pattern recorded in the run-in area includes a run-in synchronization pattern which includes a bit pattern which is longer than the longest bit length included in the bit pattern recorded in the data area and a bit pattern longer than the bit length of the frame synchronization pattern. The integrated circuit comprises binarization means for outputting a binary signal obtained by binarizing the reproduction signal; run-in synchronization detection means for detecting a run-in synchronization pattern included in the run-in area from the binary signal; frame synchronization detection means for detecting a frame synchronization pattern included in the data area from the binary signal; and demodulation means for demodulating the binary signal in accordance with the prescribed modulation rule in the data area, thereby extracting the recording data. In the case where the run-in synchronization pattern is detected by the run-in synchronization detection means in the run-in area of each of the recording blocks but the frame synchronization pattern is undetectable by the frame synchronization detection means in the vicinity of the start of the data area following the run-in area, the demodulation means performs demodulation processing on the data area based on a timing at which the run-in synchronization pattern is detected by the run-in synchronization detection means.

An integrated circuit according to the present invention is for reproducing recording data from a reproduction signal reproduced from an optical disc comprising a track divided into a plurality of recording blocks; wherein each of the plurality of blocks includes a run-in area and a data area; in the run-in area, a prescribed run-in bit pattern is recorded; in the data area, bit patterns obtained by modulating the recording data in accordance with a prescribed modulation rule are recorded; the spatial frequency corresponding to the shortest of the bit patterns in accordance with the prescribed modulation rule is higher than the cutoff frequency at which the OTF gain is 0 times; and the run-in bit pattern recorded in the run-in area includes the bit patterns generated by the prescribed modulation rule, from which the bit pattern having a bit length corresponding to the frequency higher than the OTF cutoff frequency has been excluded. The integrated circuit comprises clock generation means for generating a clock signal phase-synchronized to bits of the reproduction signal; adaptive equalization means for outputting a binary signal obtained by performing adaptive equalization and then binarization on the reproduction signal; and demodulation means for demodulating the binary signal in accordance with the prescribed modulation rule in the data area, thereby extracting the recording data. The clock generation means performs locking control for phase synchronization on the reproduction signal and the clock signal in the run-in area at a higher gain than in the data area. The adaptive equalization means performs locking control for adaptive equalization in the run-in area at a higher gain than in the data area.

An integrated circuit according to the present invention is for generating a recording signal for recording data on an optical disc comprising a track divided into a plurality of recording blocks; wherein each of the plurality of blocks includes a run-in area and a data area; in the run-in area, a prescribed run-in bit pattern is recorded; and in the data area, a bit pattern, obtained by modulating the recording data in accordance with a prescribed modulation rule and then inserting a prescribed frame synchronization pattern at every prescribed frame length, is recorded. The integrated circuit comprises run-in bit pattern generation means for generating the run-in bit pattern; data bit pattern generation means for generating a data bit pattern obtained by modulating the recording data in accordance with a prescribed modulation rule and then inserting a prescribed frame synchronization pattern at every prescribed frame length; and recording means for recording the run-in bit pattern in the run-in area, and recording the data bit pattern in the data area, of each of the recording blocks of the optical disc. The run-in bit pattern generated by the run-in bit pattern generation means includes a run-in synchronization pattern which includes a bit pattern longer than the longest bit length included in the bit pattern recorded in the data area and a bit pattern longer than the bit length of the frame synchronization pattern.

An integrated circuit according to the present invention is for generating a recording signal for recording data on an optical disc comprising a track divided into a plurality of recording blocks; wherein each of the plurality of blocks includes a run-in area and a data area; in the run-in area, a prescribed run-in bit pattern is recorded; in the data area, bit patterns obtained by modulating the recording data in accordance with a prescribed modulation rule are recorded; and the spatial frequency corresponding to the shortest of the bit patterns in accordance with the prescribed modulation rule is higher than the cutoff frequency at which the OTF gain is 0 times. The integrated circuit comprises run-in bit pattern generation means for generating the run-in bit pattern; data bit pattern generation means for generating a data bit pattern obtained by modulating the recording data in accordance with the prescribed modulation rule and then inserting a prescribed frame synchronization pattern at every prescribed frame length; and recording means for recording the run-in bit pattern in the run-in area, and recording the data bit pattern in the data area, of each of the recording blocks of the optical disc. The run-in bit pattern generated by the run-in bit pattern generation means includes the bit patterns generated by the prescribed modulation rule, from which the bit pattern having a bit length corresponding to the frequency higher than the OTF cutoff frequency has been excluded.

According to the present invention, a run-in synchronization pattern having a longer bit length than the bit lengths present in the data area is located in the bit pattern in the run-in area. Owing to this, even when the phase synchronization locking by the PLL circuit or the adaptive equalization locking by the adaptive equalization circuit is insufficient, the run-in synchronization pattern having a long bit length is easily detectable. Therefore, data following the run-in area based on the run-in synchronization pattern detection position can be demodulated. Thus, the generation of continuous data errors is avoided.

For performing high density recording with which the spatial frequency corresponding to the shortest bit is higher than the cutoff frequency at which the OTF gain is 0 times, the run-in bit pattern recorded in the run-in area includes bit patterns generated by the prescribed modulation rule, from which the bit pattern having a bit length corresponding to the frequency higher than the OTF cutoff frequency has been excluded. Owing to this, the positions of all the mark/space borders in the run-in bit pattern are easily obtained from the reproduction signal. Therefore, the locking by the PLL circuit and the locking by the adaptive equalization circuit can be performed stably.

The run-in bit pattern includes the bit patterns generated by the prescribed modulation rule, from which the bit pattern having a bit length corresponding to the frequency higher than the OTF cutoff frequency has been excluded, and which have a bit length equal to or shorter than a bit length corresponding to a spatial frequency at which the OTF gain is maximum. Alternatively, the run-in bit pattern includes both a combination of bit patterns having a small bit length difference and a combination of bit patterns having a large bit length difference. Owing to such a structure, the locking by the adaptive equalization circuit can be appropriately performed for bit patterns other than the bit pattern corresponding to a spatial frequency higher than the OTF cutoff frequency. Therefore, while data errors caused by a bit pattern corresponding to a low spatial frequency are suppressed, adaptive equalization control can be stably performed on bit patterns corresponding to a spatial frequency higher than the OTF cutoff frequency.

In the run-in bit pattern, a first includes a pattern in which short bit lengths appear at a high frequency. In this case, there are many mark/space borders, and much timing information necessary for the PLL circuit to control the phase of the channel clock signal and the reproduction signal is obtained. Thus, the locking control is made easier. After the locking by the PLL circuit is stabilized, a stable channel clock signal can be used in a second half of the area to allow the adaptive equalization circuit to perform the accurate locking.

BRIEF DESCRIPTION OF THE DRAWINGS

FIG. 10 shows a bit pattern combination having a length of 20T.

FIG. 11 shows a bit pattern combination having a length of 22T.

FIG. 12 shows a bit pattern combination having a length of 30T.

FIG. 13 shows a bit pattern combination having a length of 30T.

FIG. 14(A) shows an example of a BD having a conventional recording density, and FIG. 14(B) shows an example of a disc having a higher density than that of the BD.

DETAILED DESCRIPTION OF PREFERRED EMBODIMENTS

Hereinafter, embodiments of an optical disc and an optical disc apparatus according to the present invention will be described.

Embodiment 1

Figure 1:
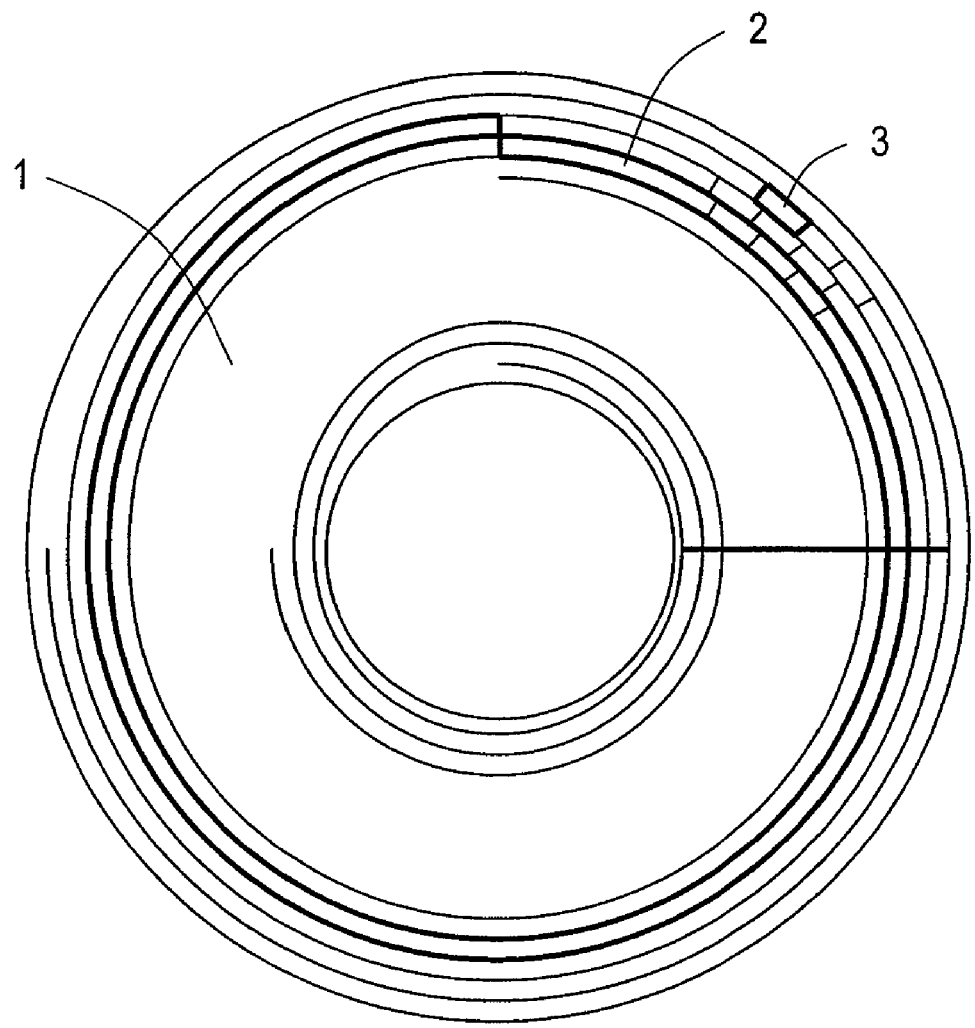
FIG. 1 shows a physical structure of an optical disc 1 according to Embodiment 1.

FIG. 1 shows a physical structure of an optical disc 1 according to this embodiment. On a Discus-Shaped Optical disc 1, a great number of tracks 2 are formed in a spiral, for example. On each track 2, a great number of tiny sectors are formed. As described later, data is recorded on each track 2 in units of blocks 3 having a predetermined size.

Figure 2:
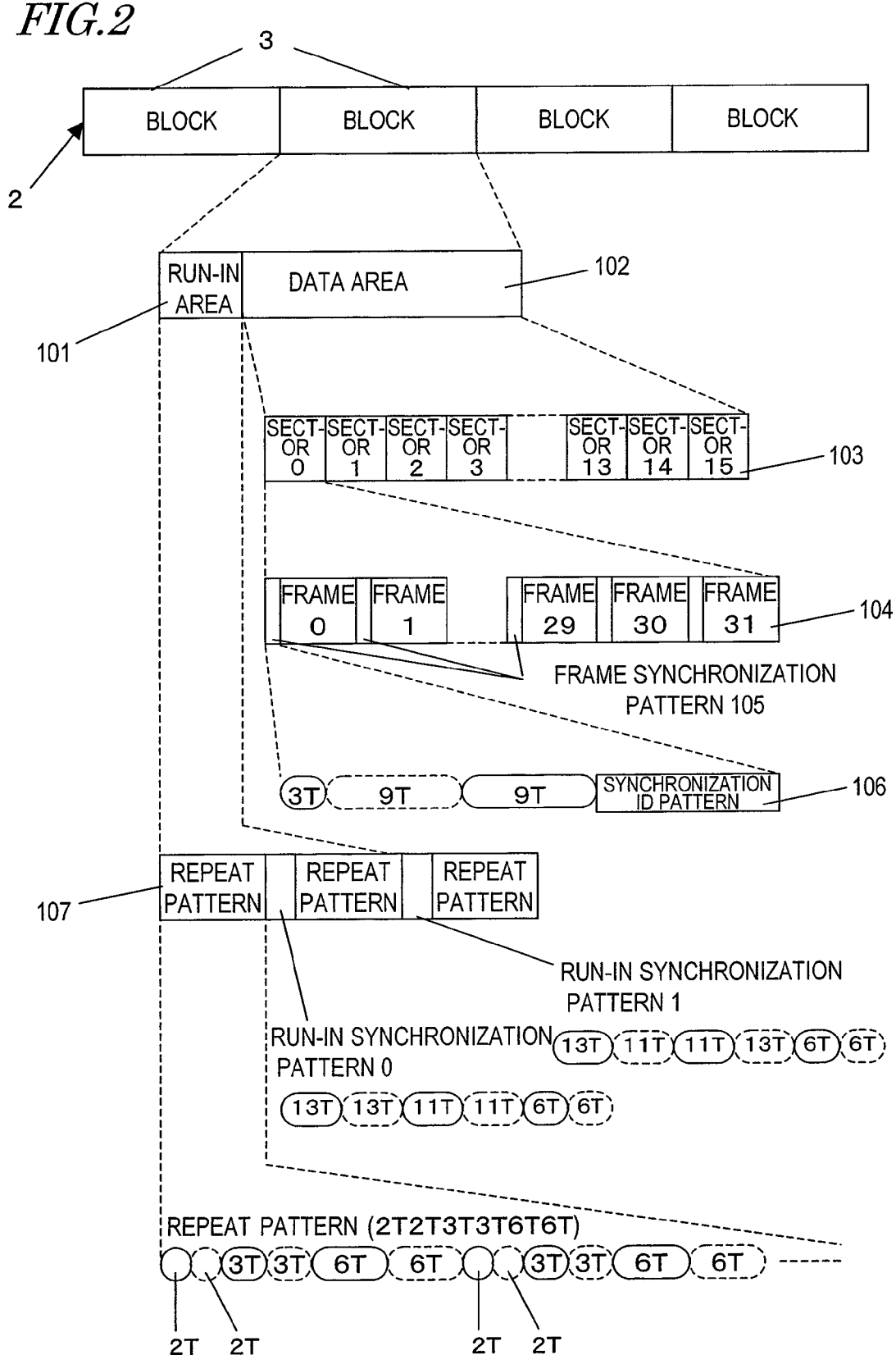
FIG. 2 shows a recording format of the optical disc 1 according to Embodiment 1.

FIG. 2 shows a recording format of the optical disc 1 according to this embodiment.

Data is recorded on the track 2 in units of blocks 3 obtained by performing error correction coding processing at every prescribed data amount. The track 2 is assigned block addresses on a block-by-block basis.

Each block 3 includes a run-in area 101 used for synchronization detection during reproduction provided at the start and a data area 102 including recording data. The data area 102 is divided into a plurality of sectors 103, and each sector 103 is further divided into a plurality of frames 104. At the start of each frame 104, a frame synchronization pattern 105 is located. After the frame synchronization pattern 105, a bit pattern obtained by modulating the data to be recorded in accordance with a prescribed modulation rule is recorded. A bit pattern is represented as a combination of bit lengths of 2T through 8T.

The frame synchronization pattern 105 includes a prescribed bit pattern (3T/9T/9T) and a synchronization ID pattern 106 having a prescribed length. For making the frame synchronization pattern 105 identifiable, 9T, which is not included in the bit pattern obtained by modulating the recording data, is used. 3T/9T/9T is detected and the synchronization ID pattern 106 after 3T/9T/9T is determined, and thus the frame number of the frame which is being reproduced can be specified.

The run-in area 101 is divided into three zones (bit patterns) 107 of a prescribed bit length. Between two adjacent zones, run-in synchronization pattern 0 or run-in synchronization pattern 1 is inserted.

The three zones 107 each include a plurality of 2T/2T/3T/3T/6T/6T patterns. Namely, this unit pattern is repeated.

Figure 21:
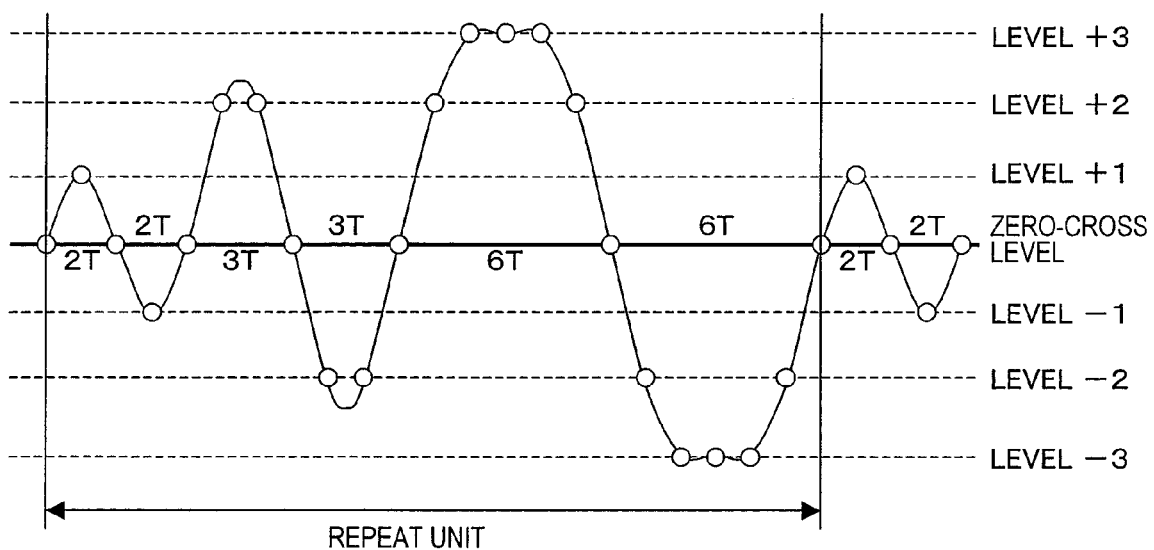
FIG. 21 shows an ideal signal waveform of a data signal of a repeat unit of 2T mark/2T space/3T mark/3T space/6T mark/6T space and synchronization sampling points by an ideal reproduction clock signal.
Figure 24:
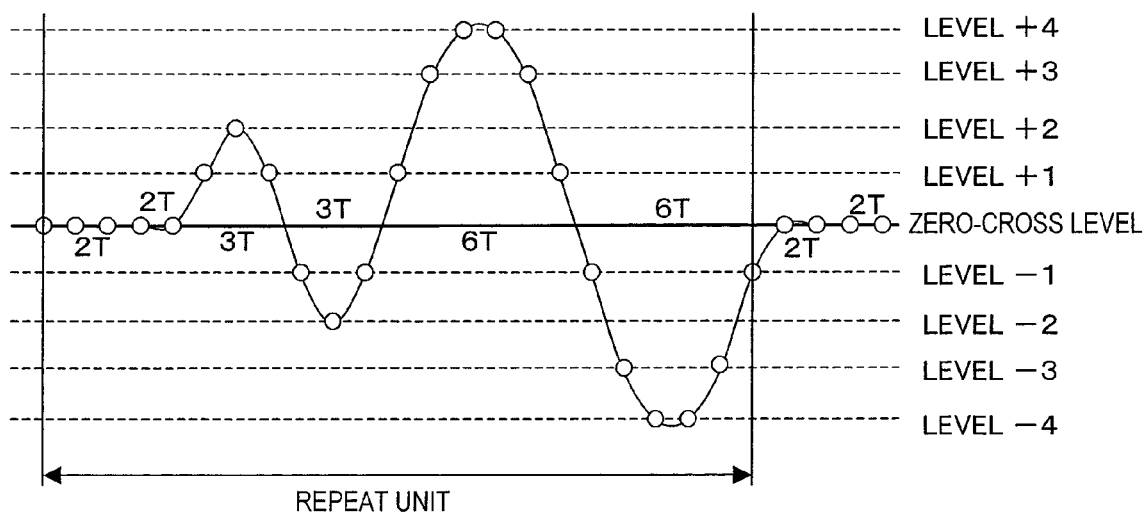
FIG. 24 shows an ideal signal waveform of a data signal of a repeat unit of 2T mark/2T space/3T mark/3T space/6T mark/6T space and synchronization sampling points by an ideal reproduction clock signal.

The unit pattern includes "2T". Therefore, when an optical disc apparatus reproduces this repeat pattern, the following occurs. Where the spatial frequency of 2T is lower than the OTF cutoff frequency (FIG. 18), a signal waveform as shown in FIG. 21 is obtained; whereas where the spatial frequency of 2T is higher than the OTF cutoff frequency (FIG. 22), a waveform as shown in FIG. 24 in which the amplitude of 2T is zero is obtained.

As is clear from the above description, the bit length of the shortest bit pattern of the optical disc 1 according to this embodiment may be the same as that of the conventional optical disc or shorter than that of the conventional optical disc. In the case where the bit length of the shortest bit pattern of a recording mark of an optical disc is set to be shorter than that of the conventional optical disc, the recording capacity of such a disc per information recording layer is expanded as compared with that of the conventional disc.

When bit synchronization is detected using the border position of the recorded mark and space in order to reproduce the optical disc 1, if the amplitude of 2T is zero, the following occurs. The position of a border relating to 2T cannot be used to detect the bit synchronization, and so information required to detect the bit synchronization is insufficient. If the bit synchronization cannot be accurately detected in a run-in area, the frame synchronization pattern of frame 0 at the start of the data area cannot be detected. As a result, data in the first one frame or the first two frames is erroneous.

In order to avoid this, in this embodiment shown in FIG. 2, three zones 107 are provided in the run-in area 101; and further run-in synchronization pattern 0 is provided between the first zone and the second zone, and run-in synchronization pattern 1 is provided between the second zone and the third zone. The run-in synchronization patterns are provided in this manner in order to ensure that the run-in area 101 is detectable. In this embodiment, a plurality of relatively long bit patterns are provided as run-in synchronization pattern 0 and run-in synchronization pattern 1. Thus, the optical disc apparatus is unlikely to make an incorrect detection.

Since the run-in synchronization pattern 0 is provided between the first and second zones and run-in synchronization pattern 1 is provided between the second and third zones, the optical disc apparatus can specify, with certainty, data at which position is currently being read. Thus, an incorrect detection can be prevented with higher certainty.

Now, a run-in synchronization pattern will be described in more detail.

In this embodiment, run-in synchronization pattern 0 is a bit pattern of 13T/13T/11T/11T/6T/6T, and run-in synchronization pattern 1 is a bit pattern of 13T/11T/11T/13T/6T/6T, 13T and 1T, which have longer bit lengths than those used in the frame synchronization pattern in the data area, are used, and there is a bit length difference of 2T in these run-in synchronization patterns. Owing to this, even if the bit synchronization frequency is shifted at a certain point, pattern detection and bit synchronization position detection can be accurately performed.

The run-in synchronization patterns are largely different from the repeat pattern and are inserted at prescribed positions. Therefore, the run-in synchronization patterns can be detected out of the run-in bit patterns. The start position of frame 0 can be easily estimated from the data which is being reproduced from the run-in area instead of the data area. In addition, there are two run-in synchronization patterns. Therefore, even if run-in synchronization pattern 0 is undetectable, as long as run-in synchronization pattern 1 is detectable, the start position of frame 0 can be estimated. Using both of the run-in synchronization patterns, the probability of the start position of frame 0 being accurately estimated can be further improved.

In the above-described embodiment, an example of the structure of the recording format and an example of the bit pattern in the run-in area are provided. The present invention is not limited to these.

Embodiment 2

Figure 3:
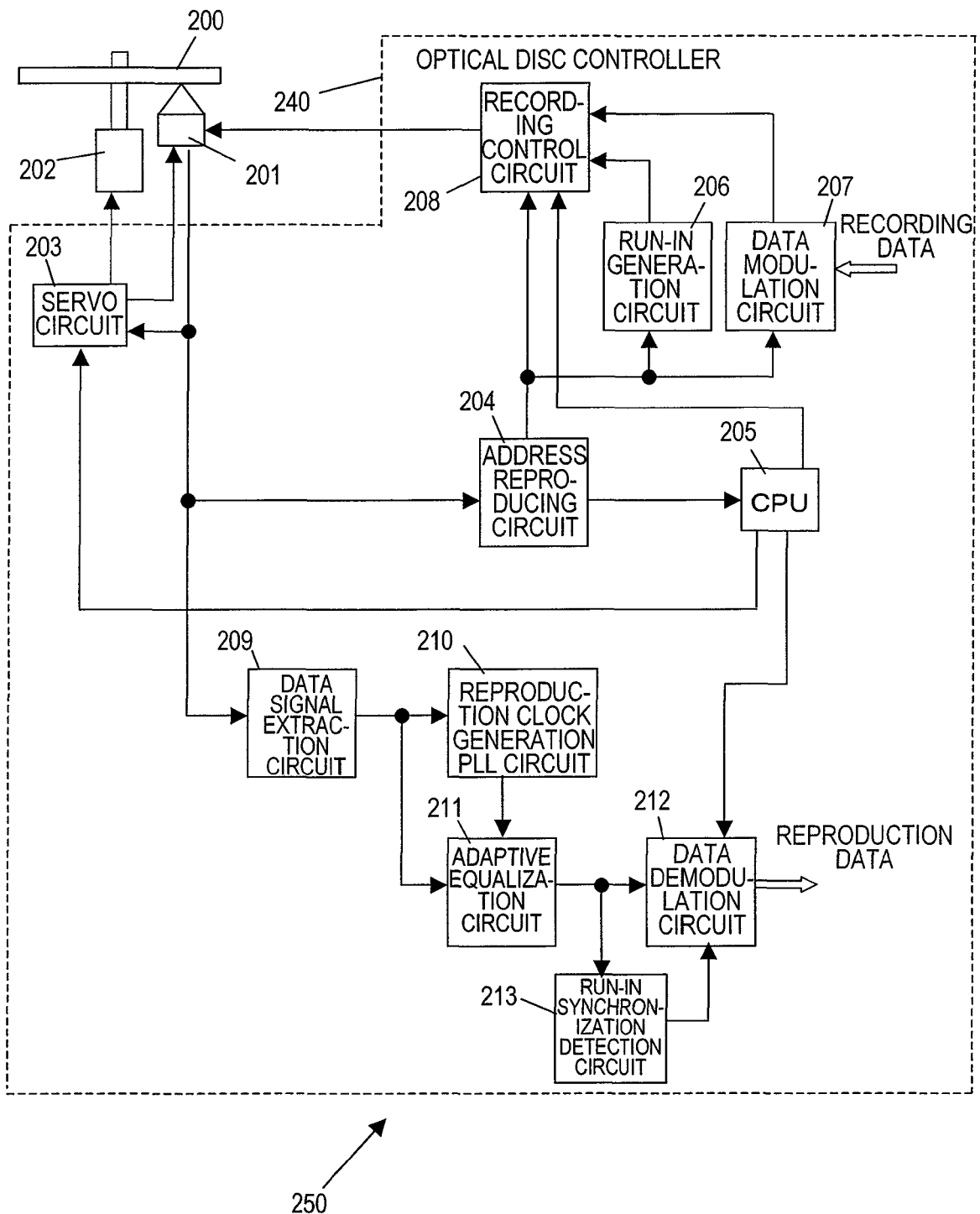
FIG. 3 is a block diagram showing a structure of an optical disc apparatus 250 according to Embodiment 2.

FIG. 3 is a block diagram showing a structure of an optical disc apparatus 250 according to this embodiment.

The optical disc apparatus 250 shown in FIG. 3 is capable of both reproducing data from an optical disc 200 and recording data to the optical disc 200. This is merely an example, and the optical disc apparatus 250 only needs to be capable of performing at least one of data reproduction and data recording.

The optical disc apparatus 250 includes an optical head 201, a motor 202, a servo circuit 203, an address reproducing circuit 204, a CPU 205, a run-in generation circuit 206, a data modulation circuit 207, a recording control circuit 208, a data signal extraction circuit 209, a reproduction clock generation PLL circuit 210, an adaptive equalization circuit 211, a data demodulation circuit 212, and a run-in synchronization detection circuit 213.

The servo circuit 203, the address reproducing circuit 204, the CPU 205, the run-in generation circuit 206, the data modulation circuit 207, the recording control circuit 208, the data signal extraction circuit 209, the reproduction clock generation PLL circuit 210, the adaptive equalization circuit 211, the data demodulation circuit 212, and the run-in synchronization detection circuit 213 are mounted as a one-chip circuit (optical disc controller) 240. It is not necessary that all these elements are incorporated into one chip. For example, the servo circuit 230 does not need to be incorporated. The address reproducing circuit 204 may be incorporated into the optical head 201. Alternatively, these elements may be provided as separate circuits instead of being incorporated into one chip.

The optical disc 200 has a track on which data is recordable, and data is recorded on the track in accordance with the recording format described above in Embodiment 1 of the present invention. The optical disc 200 is dismountable from the optical disc apparatus 250, and is not an element of the optical disc apparatus 250.

The optical disc 201 irradiates the optical disc 200 with a light beam, detects an amount of light reflected from the optical disc 200 while scanning the track, and outputs an electric signal.

The motor 202 rotates the optical disc 200 at a specified rotation rate.

The servo circuit 203 extracts, from the electric signal, a servo error signal in accordance with the light collection state of the light beam on the track, and performs control using the servo error signal such that the light collection state of the light beam from the optical head 201 on the track and the scanning state of the track are optimal. The servo circuit 203 also controls the radial position on the optical disc 200 to be irradiated with the light beam and the rotation rate of the motor 202 to be optimal.

The address reproducing circuit 204 extracts, from the electric signal, an address signal including address information pre-recorded on the track of the optical disc 200, reproduces the address information from the address signal, and also detects a synchronization position to the block on the track of the optical disc 200.

The CPU 205 perform a search to find a block to/from which data is to be recorded/reproduced while obtaining the address information from the address reproducing circuit 204, and issues an instruction on a recording operation or a reproduction operation. The data is recorded on the optical disc 200 by the run-in generation circuit 206, the data modulation circuit 207, and the recording control circuit 208. The data is reproduced by the data signal extraction circuit 209, the reproduction clock generation PLL circuit 210, the adaptive equalization circuit 211, the data demodulation circuit 212, and the run-in synchronization detection circuit 213.

Figure 4:
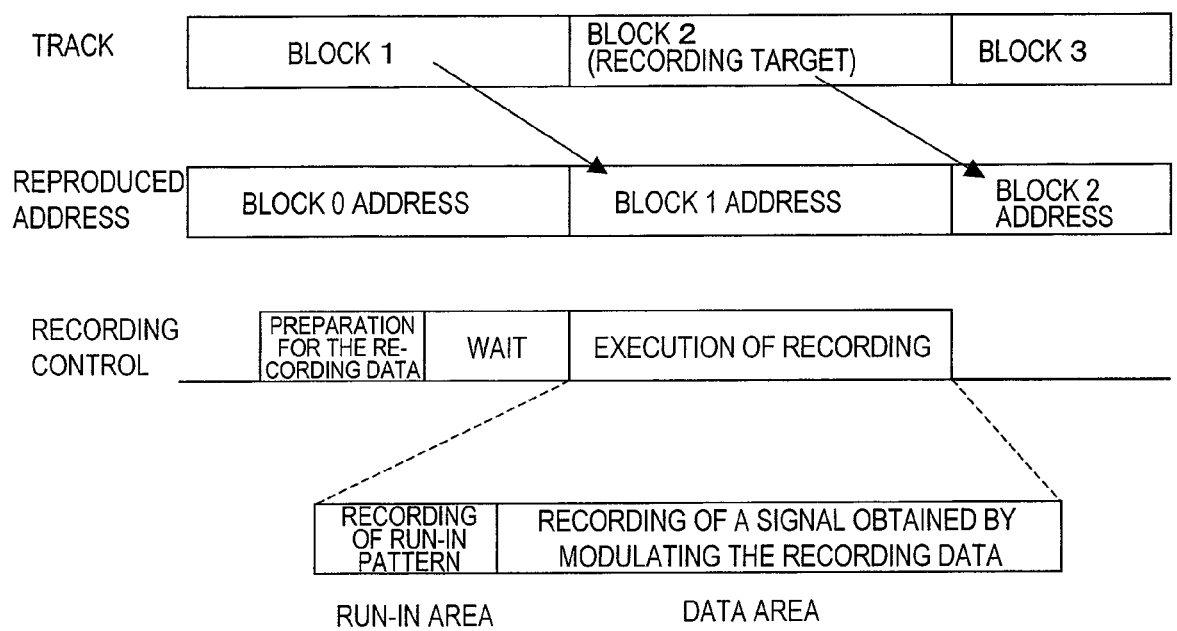
FIG. 4 is a timing diagram showing a recording operation of the optical disc apparatus 250.

Now, a recording operation of the optical disc apparatus 250 will be described. FIG. 4 is a timing diagram showing the recording operation of the optical disc apparatus 250.

The run-in generation circuit 206 generates a run-in area bit pattern to be recorded in the run-in area. The run-in area bit pattern is the bit pattern shown in the run-in area 101 in FIG. 2 described above in Embodiment 1. The bit pattern is output to the recording control circuit 208 in a zone of the run-in area based on the block synchronization position detected by the address reproducing circuit 204.

As a preparation for the recording data, the data modulation circuit 207 generates error correcting code (ECC) data obtained by performing prescribed error correction coding processing on the recording data. During execution of the recording, the data modulation circuit 207 sequentially modulates the ECC data in accordance with a prescribed modulation rule. For performing the modulation, the data modulation circuit 207 inserts a frame synchronization pattern to each frame. The generated data area bit pattern is output to the recording control circuit 208 in a zone of the data area based on the block synchronization position detected by the address reproducing circuit 204.

Upon receiving an instruction to perform on recording from the CPU 205, the recording control circuit 208 selects, as a recording signal, the run-in area bit pattern obtained from the run-in generation circuit 206 in the run-in area of the block having a specified address, and selects, as a recording signal, the data area bit pattern obtained from the data modulation circuit 207 in the data area of such a block. The recording control circuit 208 controls the intensity of the light beam to be output from the optical head 201 based on the recording signal, and thus records the bit pattern to a prescribed block of the optical disc 200.

Figure 5:
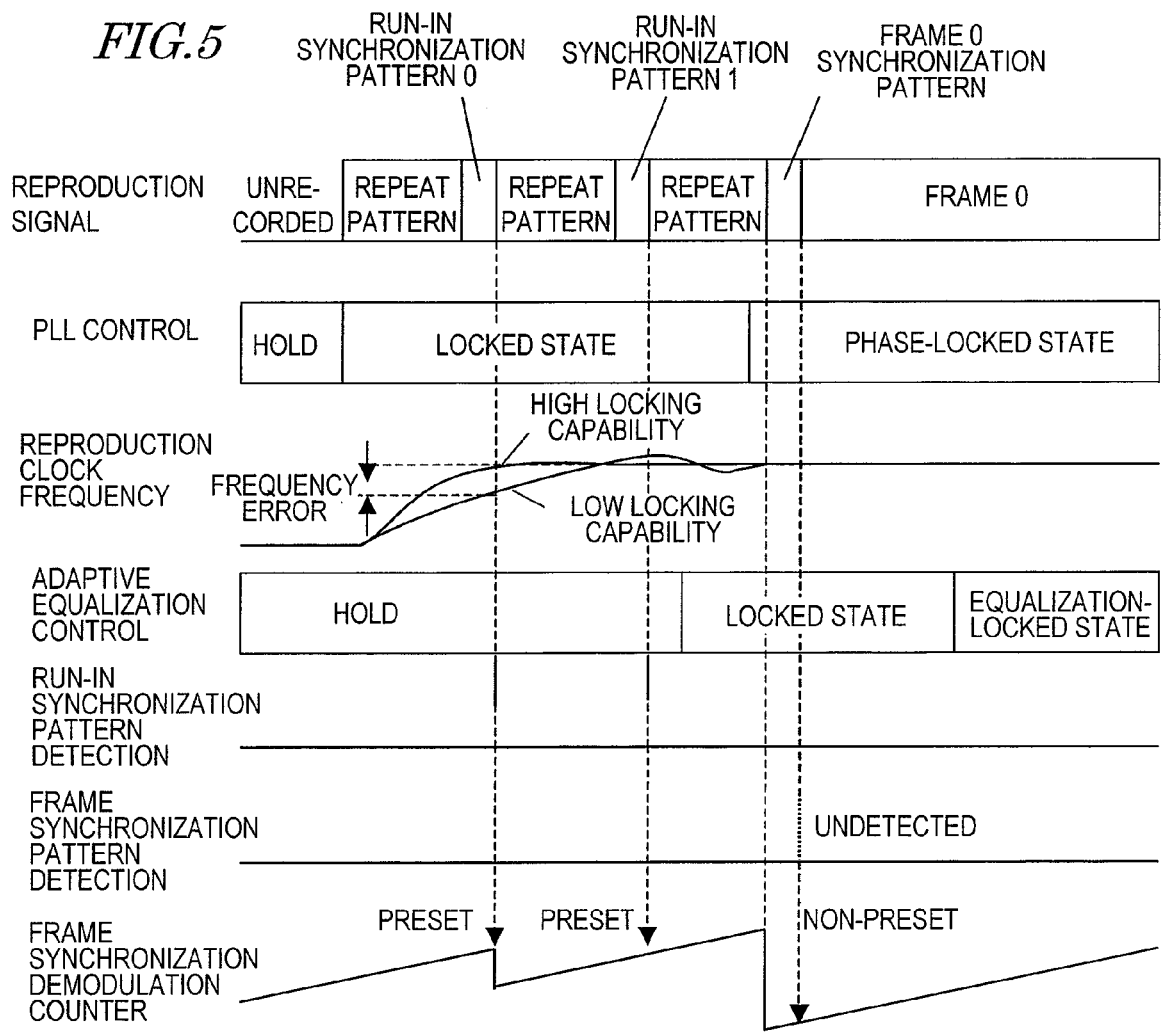
FIG. 5 is a timing diagram showing a reproduction operation of the optical disc apparatus 250.

Now, a reproduction operation of the optical disc apparatus 250 will be described. FIG. 5 is a timing diagram showing the reproduction operation of the optical disc apparatus 250.

The data signal extraction circuit 209 extracts a data signal ("reproduction signal" in the figure) in accordance with the marks and spaces recorded on the track of the optical disc 200, from the electric signal detected by the optical head 201.

The reproduction clock generation PLL circuit 210 generates a reproduction clock signal phase-synchronized to the data signal. As shown in "PLL control" of FIG. 5, the reproduction clock generation PLL circuit 210 is in a hold state in an unrecorded zone in which no data is recorded.

When the reproduction signal goes into a state in which the reproduction signal includes information on the run-in area of the block in which data is recorded, the "PLL control" is put into a state of performing a locking operation. First, using the repeat pattern of the run-in bit pattern, frequency locking is performed as shown in "reproduction signal frequency" of FIG. 5. When the frequencies substantially match each other, phase locking is performed so as to synchronize the phases. The phase locking is completed by a position immediately before the data area. After this, the phase locked state is maintained in the data area.

Figure 18:
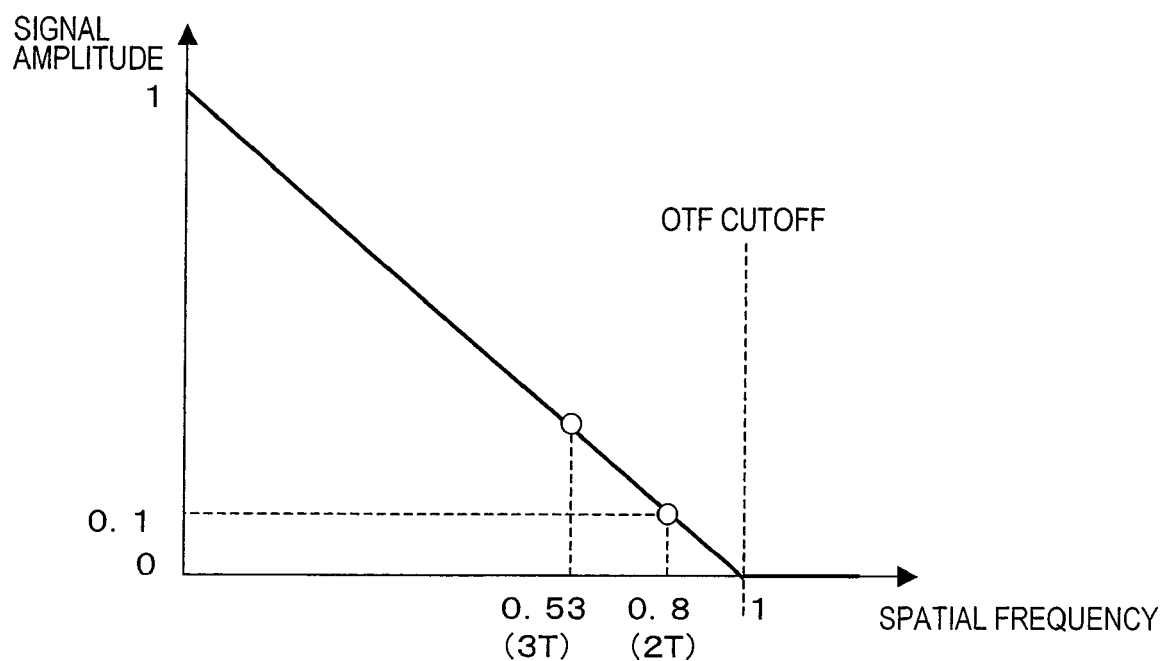
FIG. 18 shows the relationship between the optical resolving power of a BD and the shortest bit length 2T.
Figure 19:
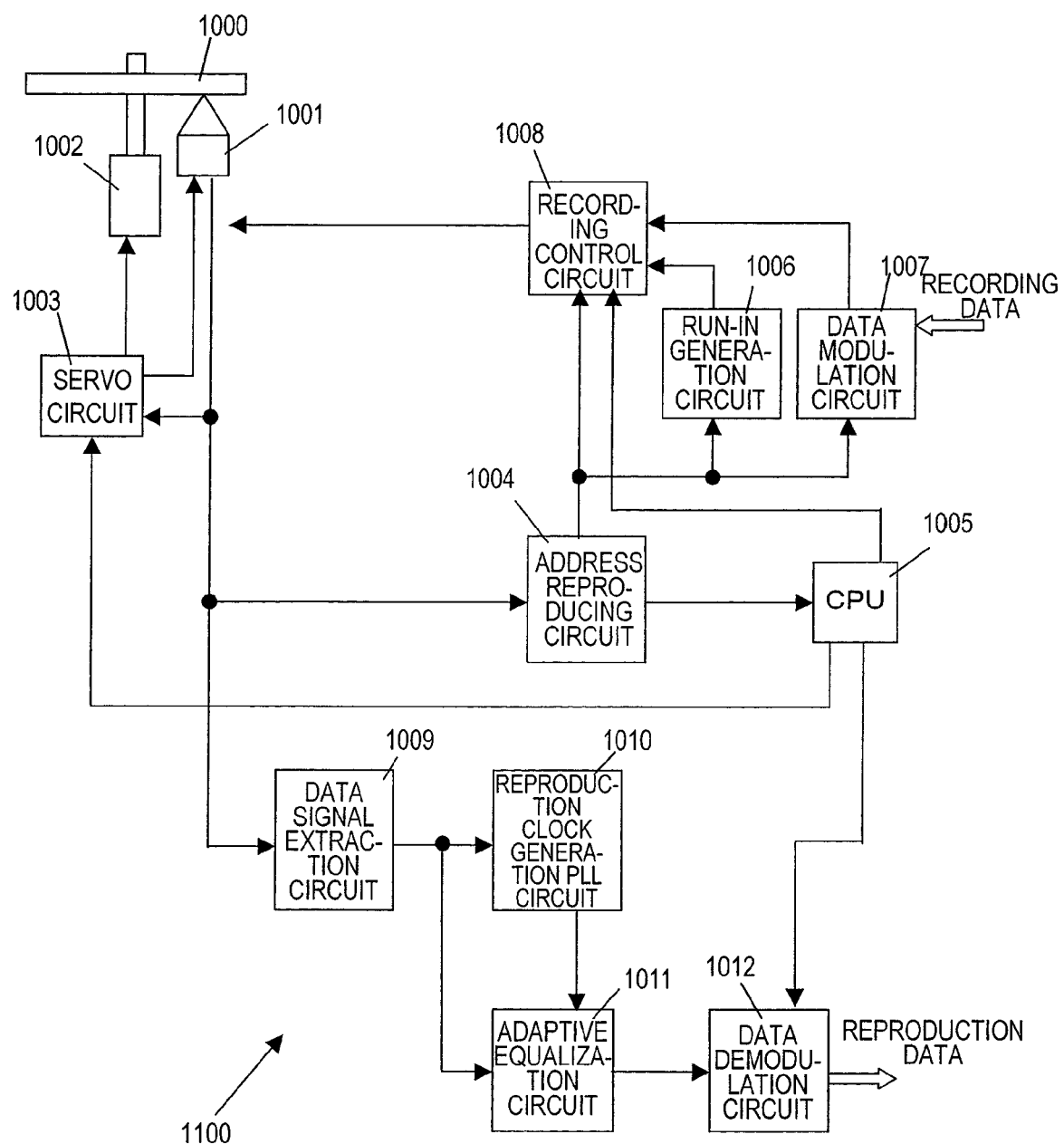
FIG. 19 shows a structure of a conventional optical disc apparatus 1100.

When the recording density of the optical disc 200 is such that the spatial frequency of 2T is lower than the OTF cutoff frequency as shown in FIG. 18, the positions of all the mark/ space borders are obtained in the data signal in the run-in area as shown in FIG. 21. Therefore, a sufficient control gain is obtained by the reproduction clock generation PLL circuit 210. Owing to this, as shown as a change of "reproduction clock frequency" of FIG. 5, the locking capability is high and both the frequency locking and the phase locking can be completed at an early stage of the run-in area. Thus, a sufficient extra time can be obtained before the timing of the start position of the data area.

Figure 22:
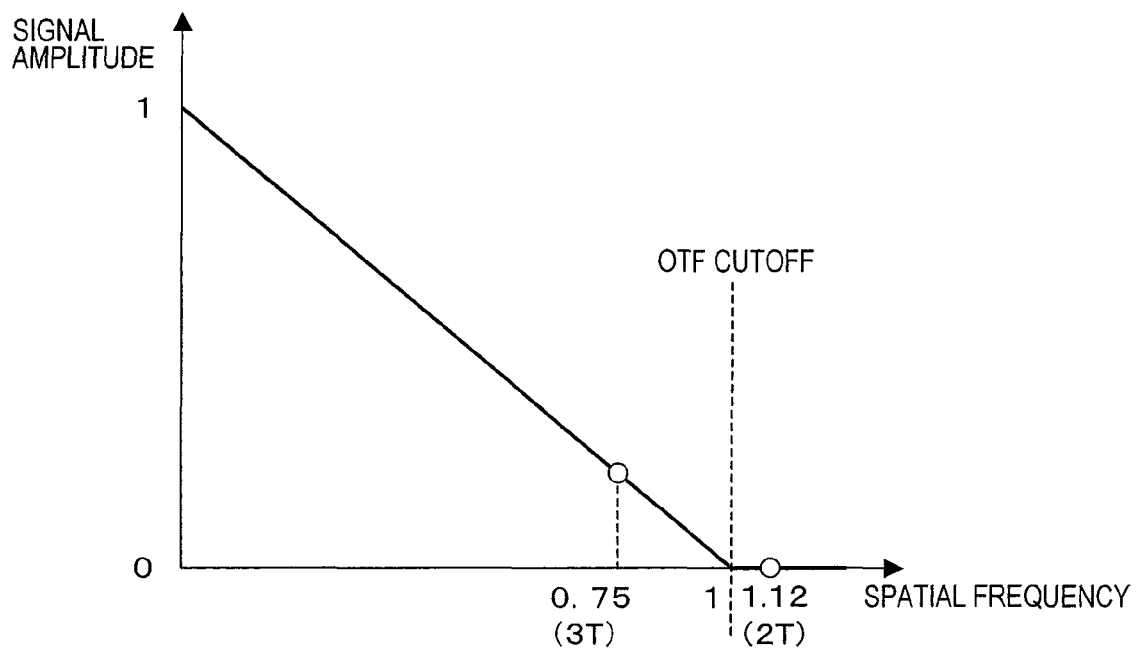
FIG. 22 shows an example in which the spatial frequency of 2T is higher than the OTF cutoff frequency and the amplitude of the reproduction signal of 2T is 0.

By contrast, when the recording density of the optical disc 200 is such that the spatial frequency of 2T is higher than the OTF cutoff frequency as shown in FIG. 22, the positions of the mark/space borders relating to 2T are not obtained in the data signal in the run-in area as shown in FIG. 24. Therefore, the control gain of the reproduction clock generation PLL circuit 210 is insufficient. The signal waveform is likely to be distorted due to inter-code interference. Therefore, the gain needs to be still lower in order to stabilize the reproduction clock generation PLL circuit 210. As a result, as shown as a change of "reproduction clock frequency" of FIG. 5, the locking capability is low and the frequency locking and the phase locking both require a long time. Thus, it is difficult to obtain a sufficient extra time before the timing of the start position of the data area.

In this embodiment, the above problems are solved by use of the adaptive equalization circuit 211. The adaptive equalization circuit 211 performs three types of processing, i.e., equalization filtering processing, adaptive control processing of a filter coefficient of the equalization filtering circuit, and Viterbi decoding processing of binarizing an output from the equalization filtering circuit. These types of processing may be implemented as software processing or as circuits performing the respective processing. In the following, these types of processing is each implemented as a respective circuit.

Figure 20:
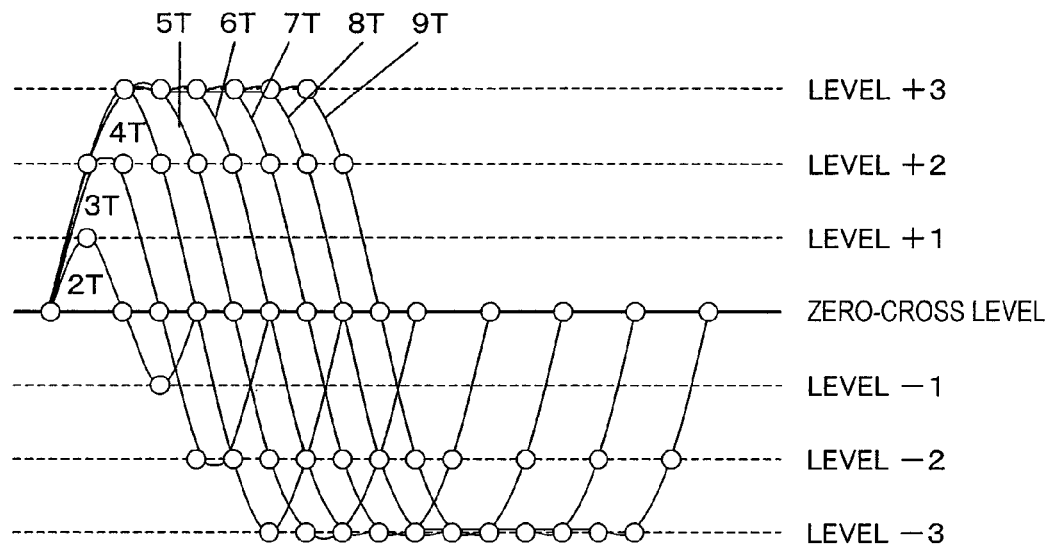
FIG. 20 shows an ideal signal amplitude of each of signal waveforms of 2T through 9T and synchronization sampling points by an ideal reproduction clock signal, where the optical transfer function (OTF) is as shown in FIG. 18.

When the spatial frequency of 2T is lower than the OTF cutoff frequency (FIG. 18), the target of the output signal from the equalization filtering circuit is that the signal amplitude of each of 2T through 9T and the sampling points by the reproduction clock signal realize the state of the waveform diagram shown in FIG. 20. The adaptive control circuit controls the filter coefficient such that the amplitude and the phase of the output signal from the equalization filtering circuit are close to the target levels. The Viterbi decoding circuit compares the output signal from the equalization filtering circuit and the target waveform shown in FIG. 20 to perform maximum likelihood decoding and outputs the result as a binary signal binarized into a mark and a space.

When the frequency of the data signal and the frequency of the reproduction clock signal are largely dispersed, an error of the amplitude and the phase with respect to the target levels cannot be accurately found. Therefore, as shown in "adaptive equalization control" of FIG. 5, the operation of the adaptive control circuit is on hold until a prescribed timing at which the locking operation by the reproduction clock generation PLL circuit 210 is estimated to be completed. At the prescribed timing, the adaptive control circuit is released from the held state and starts the locking for adaptive equalization control. The adaptive control circuit operates so as to complete the locking in the vicinity of the start of the data area and then maintain the locked state.

By contrast, when the recording density of the optical disc 200 is higher and so the spatial frequency of 2T is higher than the OTF cutoff frequency (FIG. 22), the locking capability of the reproduction clock generation PLL circuit 210 is low. Therefore, an error is likely to occur also in the control performed by the adaptive equalization circuit and the locking operation is not stable. Accordingly, until the adaptive control circuit completes the locking in a sufficient state, the binary signal output from the Viterbi decoding circuit also includes many errors.

When the recording density is increased as described above, the following occurs in a worst case. Since the locking performed by the reproduction clock generation PLL circuit 210 and the locking performed by the adaptive equalization circuit 211 are not completed within the run-in area, the frame synchronization pattern of frame 0 cannot be detected. As a result, all the data in frames 1 and 2 or the like is erroneous.

In order to avoid this, the run-in synchronization detection circuit 213 detects run-in synchronization pattern 0 and run-in synchronization pattern 1 shown in FIG. 2, and outputs a run-in synchronization pattern detection signal. The run-in synchronization pattern is detected depending on the 13T and 11T part. When the length ratio is 3:13:11:11, the run-in synchronization pattern is detected as run-in synchronization pattern 0. When length ratio is 13:11:11:13, the run-in synchronization pattern is detected as run-in synchronization pattern 1. The run-in synchronization pattern 0 and run-in synchronization pattern 1 are clearly different from the repeat pattern located therebefore and thereafter, and are bit patterns corresponding to a sufficiently lower spatial frequency than the OTF cutoff frequency and so are unlikely to be influenced by the inter-code interference. Even when the locked states realized by the reproduction clock generation PLL circuit 210 and the adaptive equalization circuit 211 are insufficient as described above, these run-in synchronization patterns are easily detectable. The run-in synchronization patterns each have a length of 60T. The last 6T part is immediately followed by 2T of the repeat pattern and so is likely to be influenced by the waveform distortion. Even with this 6T part being excluded, the run-in synchronization patterns have a length of 54T, which is sufficient to detect a frequency error of about 1.85% or higher and thus to correct the error of the reproduction clock generation PLL circuit 210.

The data demodulation circuit 212 detects the frame synchronization pattern from the binary signal which is output from the adaptive equalization circuit 211 to operate a frame synchronization demodulation counter which has been frame-synchronized, and demodulates the binary signal in accordance with a prescribed modulation rule at the timing provided by the frame synchronization demodulation counter. Then, the data demodulation circuit 212 performs prescribed error correction processing on the obtained one block of demodulated data to correct the error thereof, and outputs the obtained data as reproduction data.

If the locked states realized by the reproduction clock generation PLL circuit 210 and the adaptive equalization circuit 211 are insufficient and so the frame synchronization pattern of frame 0 is undetected by the data demodulation circuit 212, the frame synchronization demodulation counter is not preset to a correct timing. Therefore, until the data demodulation circuit 212 detects the frame synchronization pattern of frame 1 or frame 2 and presets the frame synchronization demodulation counter to a correct timing, all the demodulated data is erroneous. In order to avoid this, the run-in synchronization pattern detection signal is used to preset the frame synchronization demodulation counter at the detection timing of run-in synchronization pattern 0 and run-in synchronization pattern 1 in the run-in area. Owing to this, even if the frame synchronization pattern of frame 0 is undetected, the demodulation processing is performed at a correct timing because the frame synchronization demodulation counter has already been preset to a correct timing by the run-in synchronization pattern. Therefore, the demodulated data can be prevented from being erroneous continuously.

In the above-described embodiment, the optical disc apparatus 250 compatible to the above-described examples of the structure of the recording format and the bit pattern in the run-in area is provided. The present invention is not limited to this.

In the above-described embodiment, an example of the target equalization level for the adaptive equalization circuit are provided. The present invention is not to this.

Embodiment 3

Figure 6:
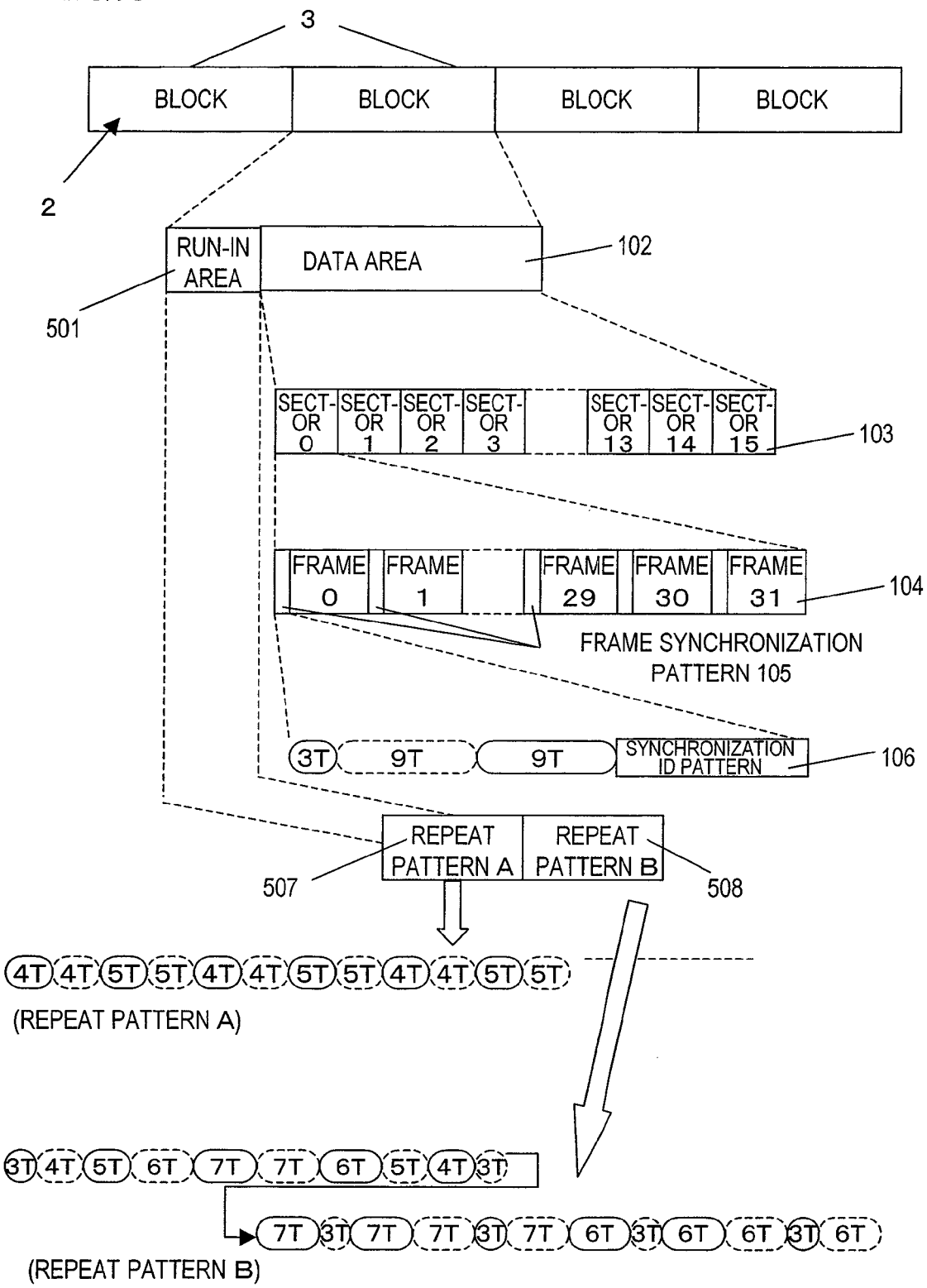
FIG. 6 shows a recording format of an optical disc according to Embodiment 3.

FIG. 6 shows a recording format of an optical disc according to this embodiment. The format shown in this figure is different from the format shown in FIG. 2 in a run-in area 501 included in the block 3. The data area 102 shown in FIG. 6 is the same as the data shown in FIG. 2, and so will not be described. The external structure of the optical disc in this embodiment is the same as the optical disc 1 shown in FIG. 1 according to Embodiment 1.

In addition, the optical disc according to this embodiment is structured such that the spatial frequency of the shortest bit length 2T is 1.12 times of the OTF cutoff frequency as shown in FIG. 22.

The run-in area 501 is divided into two areas 507 and 508. The bit pattern in a first area 507 is repeat pattern A shown in FIG. 6, and the bit pattern in a second area 508 is repeat pattern B shown in FIG. 6.

Pattern A in the first area includes a repetition of 4T/4T/5T/5T. Neither 2T, corresponding to a frequency exceeding the OTF cutoff frequency, nor 3T, corresponding to a spatial frequency close to the OTF cutoff frequency and a small amplitude, is used. A long bit length, which reduces a mark/space border area acting as control information for the reproduction clock generation PLL circuit of an optical disc apparatus, is not used. Owing to these, the control performed by the reproduction clock generation PLL circuit is made easier. An operation of the optical disc apparatus will be described in detail in Embodiment 4.

Repeat pattern B in the second area includes a repetition of 3T/4T/5T/6T/7T/7T/6T/5T/4T/3T/7T/3T/7T/7T/3T/7T/6T/3T/6T/6T/3T/6T. Like in repeat pattern A, 2T, corresponding to a spatial frequency exceeding the OTF cutoff frequency, is not used. In a first half of this repeat unit, bit lengths close to each other are combined; whereas in a second half of this repeat unit, long bit lengths and short bit lengths are combined.

For example, where 3T, 4T, etc. is referred to as one pattern, in a part from the first until the tenth patterns (first half), combinations of bit lengths which are different by 1T or smaller are provided. In a part from the eleventh pattern until the end (second half), combinations of bit lengths which are different by 2T or larger are provided. From the eleventh pattern to the end, the difference does not always need to be 2T or greater. As shown in FIG. 6, 7T and 7T, or 6T and 6T, may be adjacent to each other, or 7T and 6T may be adjacent to each other.

More generally, where n is a natural number, repeat pattern B may be determined so as to include a combination of bit patterns having a bit length difference of nT or smaller and a combination of bit patterns having a bit length difference of (n+1) or larger.

The above-mentioned definition of "first half" and "second half" is one example. More generally, the "first half" means a part of a predefined length (prescribed length) from the start of the run-in bit pattern, and the "second half" means a part from a position immediately after the prescribed length counted from the start of the run-in bit pattern until the end of the run-in bit pattern.

Figure 23:
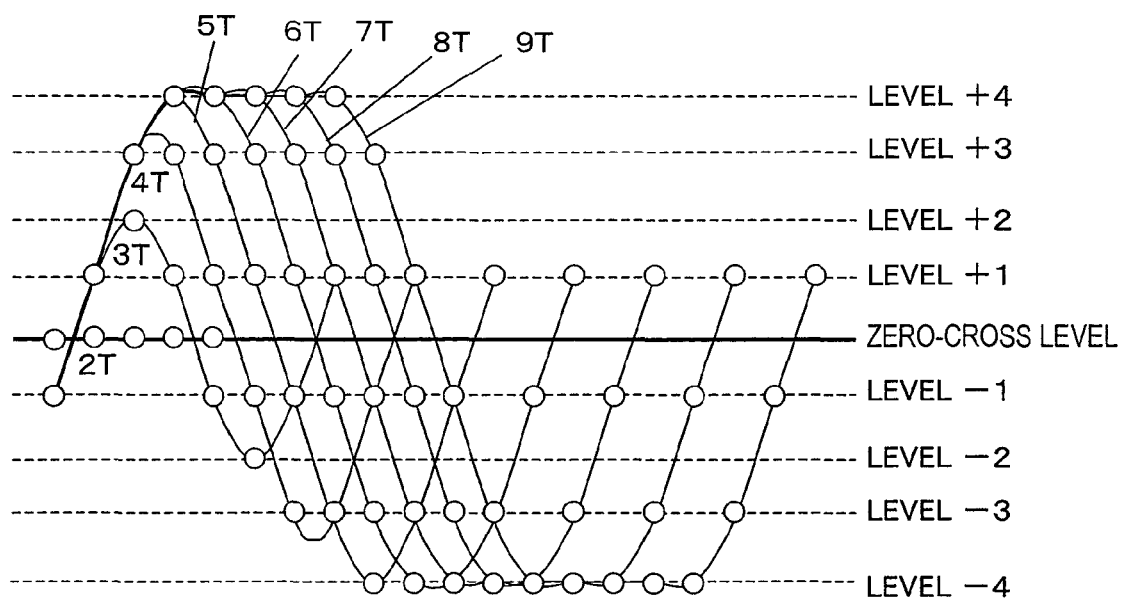
FIG. 23 shows an ideal signal amplitude of each of signal waveforms of 2T through 9T and synchronization sampling points by an ideal reproduction clock signal, where the optical transfer function (OTF) is as shown in FIG. 22.

Combinations of marks and spaces in which inter-code interference may occur are roughly classified into a combination of a mark and a space having bit lengths close to each other, a combination of long bit length spaces (or marks) and a short bit length mark (or space) sandwiched therebetween, and a combination involving 2T which causes the amplitude of the signal waveform to be zero (FIG. 23). In the locking stage for adaptive equalization of the optical disc apparatus, a waveform involving 2T having an undetectable amplitude is likely to be misrecognized and reduces the stability of locking. The stability can be improved by performing the locking on the other two combinations in which inter-code interference may occur and then performing adaptive equalization on all the combinations including the one involving 2T.

Pattern A having a combination of bit lengths close to each other is adopted in the first half of the repeat unit, so that the adaptive equalization circuit of the optical disc apparatus can perform the locking for adaptive equalization control on the inter-code interference state of pattern A. By contrast, pattern B having a combination of bit lengths far from each other is adopted in the second half of the repeat unit, so that the optical disc apparatus can perform the locking for adaptive equalization control on the inter-code interference state of pattern B. In this manner, in the zone having pattern B, appropriate adaptive equalization can be performed against the inter-code interference on the bit length combinations excluding the combination involving 2T, corresponding to a spatial frequency exceeding the OTF cutoff frequency.

Owing to the above-described run-bit patterns, the reproduction clock generation PLL circuit first performs a locking operation using repeat pattern A, and then the adaptive equalization circuit performs a locking operation for adaptive equalization using repeat pattern B. After both of the locking operations are completed, the reproduction operation from the data area can be performed. The adaptive equalization on the waveform involving 2T is not performed. Nonetheless, this does not cause a reproduction error because the adaptive equalization has been appropriately performed on the waveforms except for the waveform involving 2T. In addition, in the data area, the adaptive equalization control has been performed on the waveforms involving 2T. Therefore, the reproduction capability can be further stabilized.

In the above-described embodiment, an example of the structure of the recording format and examples of the bit pattern in the run-in area are provided. The present invention is not limited to these.

Embodiment 4

Figure 7:
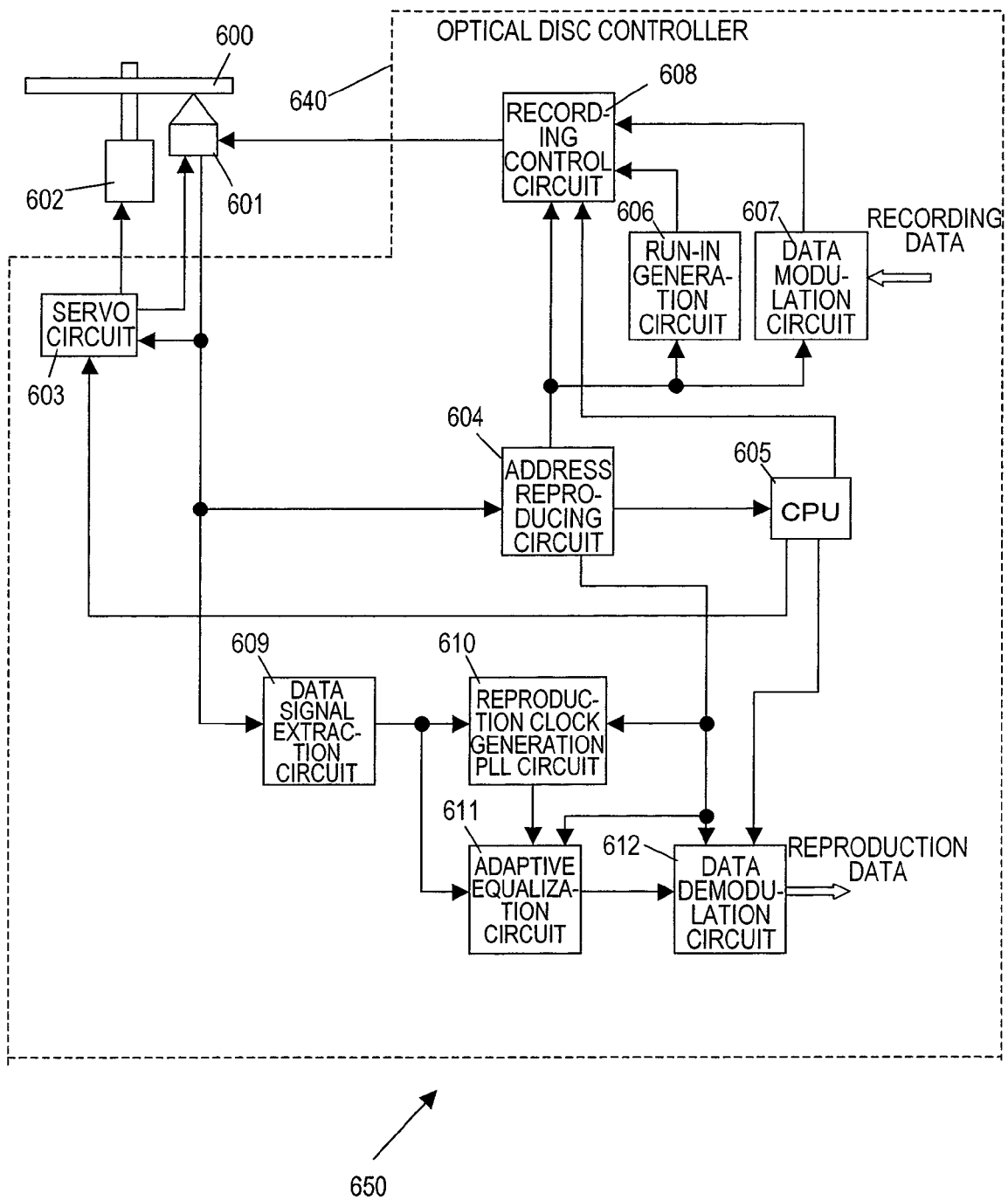
FIG. 7 is a block diagram showing a structure of an optical disc apparatus 650 according to Embodiment 4.

FIG. 7 is a block diagram showing a structure of an optical disc apparatus 650 according to this embodiment.

The optical disc apparatus 650 shown in FIG. 7 is capable of both reproducing data from an optical disc 600 and recording data to the optical disc 600. This is merely an example, and the optical disc apparatus 650 only needs to be capable of performing at least one of data reproduction and data recording.

The optical disc apparatus 650 includes an optical head 601, a motor 602, and an optical disc controller 640. The optical disc controller 640 includes a servo circuit 603, an address reproducing circuit 604, a CPU 605, a run-in generation circuit 606, a data modulation circuit 607, a recording control circuit 608, a data signal extraction circuit 609, a reproduction clock generation PLL circuit 610, an adaptive equalization circuit 611, and a data demodulation circuit 612.

The optical disc 600 has a track on which data is recordable, and data is recorded on the track in accordance with the recording format described in Embodiment 3. As in Embodiment 3, the spatial frequency of 2T is higher than the OTF cutoff frequency and is 1.12 times thereof.

The elements of the optical disc apparatus 650 in FIG. 7 which are identical with those in Embodiment 2 or Embodiment 3 will not be described. The elements other than the elements described below have the same functions as those of the elements with the same names shown in FIG. 3.

First, processing performed by the run-in generation circuit 606 relating to the data recording operation to the optical disc 600 will be described.

The run-in generation circuit 606 generates a run-in area bit pattern to be recorded in the run-in area 501 (FIG. 6). The run-in area bit pattern is the bit pattern shown in the run-in area 501 in FIG. 6 described above in Embodiment 3. The bit pattern is output to the recording control circuit 608 in a zone of the run-in area based on the block synchronization position detected by the address reproducing circuit 604. The recording control circuit 608 controls the intensity of the light beam to be output from the optical head 601 such that the run-in bit pattern is recorded in the run-in area.

Now, an operation of each of the reproduction clock generation PLL circuit 610 and the adaptive equalization circuit 611 relating to the reproduction operation from the optical disc 600 will be described.

Figure 8:
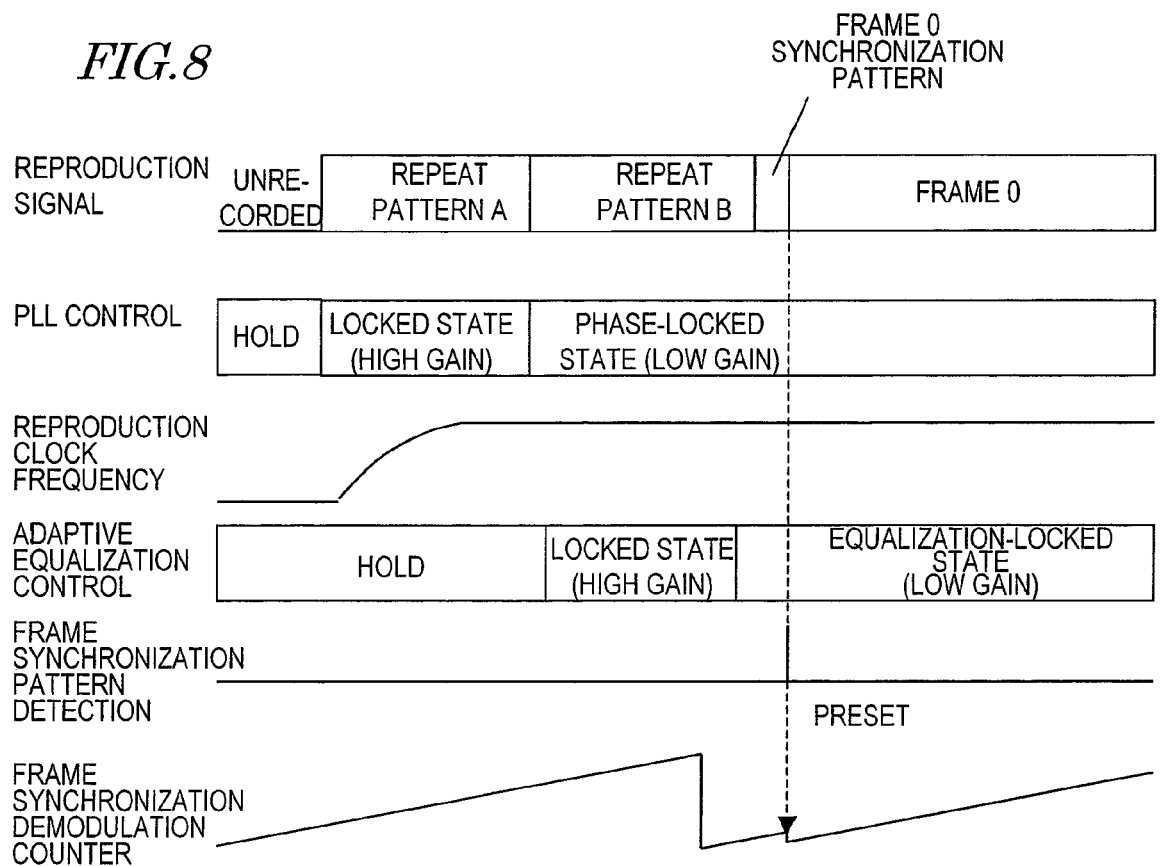
FIG. 8 is a timing diagram showing a reproduction operation of the optical disc apparatus 650.

FIG. 8 is a timing diagram showing the reproduction operation of the optical disc apparatus 650.

The address reproducing circuit 604 instructs the reproduction clock generation PLL circuit 610 to perform a locking operation at a high gain in the zone of the run-in area in which repeat pattern A is recorded based on the detected block synchronization position, and to maintain the phase-locked state at a low gain after the locking operation is finished.

In accordance with the instruction from the address reproducing circuit 604, the reproduction clock generation PLL circuit 610 operates so as to perform a locking operation at a high gain in the zone of repeat pattern A, and so as to maintain the phase-locked state at a low gain thereafter. Repeat pattern A is a simple repeat pattern of 4T/4T/5T/5T. Therefore, in the zone of repeat pattern A, the comparison of frequencies is relatively easy, and a stable locking operation can be performed within a short time by using a high gain.

From "PLL control" of FIG. 8, it is understood that the locked state is maintained in the zone in which repeat pattern A is recorded and that the phase-locked state is maintained in the zone in which repeat pattern B is recorded.

In accordance with the instruction from the address reproducing circuit 604, the adaptive equalization circuit 611 issues an instruction to hold the operation in the zone in which repeat pattern A is recorded (during the locking operation of the reproduction clock generation PLL circuit 610), issues an instruction to perform the locking operation at a high gain in the zone in which repeat pattern B is recorded, and issues an instruction to maintain the locked state of the adaptive equalization control at a low gain thereafter ("adaptive equalization control") of FIG. 8.

Repeat pattern B does not include 2T, which causes the locking to be unstable. Therefore, the locking operation can be performed at a high gain with no problem, and stable locking can be realized within a short time.

By the combination pattern of the first half of the repeat unit of repeat pattern B, the adaptive equalization control is performed so as to correct the distortion of a signal waveform caused by the influence of inter-code interference between bit lengths close to each other. By the combination pattern of the second half of the repeat unit, the adaptive equalization control is performed so as to also correct the distortion of a signal waveform caused by the influence of inter-code interference between bit lengths far from each other. In this manner, the locking for adaptive equalization is performed, in the zone of repeat pattern B, against the influence of the inter-code interferences other than the inter-code interference relating to 2T. Thus, a capability of correctly binarizing a data signal can be obtained. In the data area, control is performed to maintain the stable state at a low gain while appropriately performing adaptive equalization also against the influence of the inter-code interference relating to 2T.

According to the above-described processing, as shown in "frame synchronization pattern detection" of FIG. 8, the frame 0 synchronization pattern at the start of the data area can be stably detected. As a result, as shown in "frame synchronization demodulation counter" of FIG. 8, the frame synchronization demodulation counter in the data demodulation circuit 612 can be operated at a correct timing and thus the data demodulation error can be suppressed to be minimum.

In the above-described embodiment, examples of the structure of the recording format and examples of the bit pattern in the run-in area are provided. The present invention is not limited to these.

Embodiment 5

Figure 9:
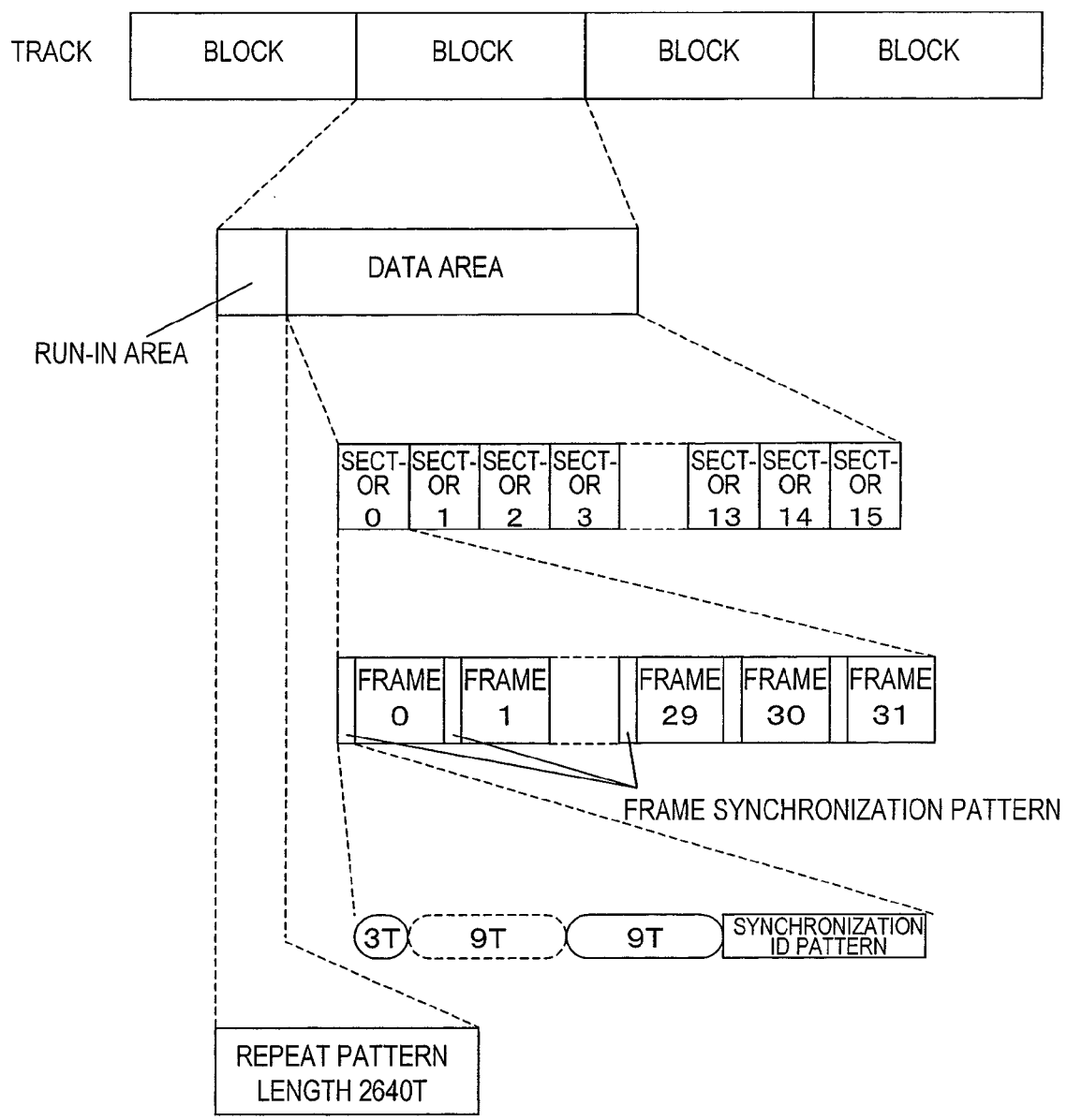
FIG. 9 shows a recording format of an optical disc according to Embodiment 5.

FIG. 9 shows a recording format of an optical disc according to this embodiment. The data structure of this optical disc is similar to the data structure shown in FIG. 6.

Data is recorded in units of blocks obtained by performing error correction coding processing at every prescribed data amount.

A block includes a run-in area used for synchronization detection during reproduction provided at the start thereof and a data area including the recording data. The data area is divided into a plurality of sectors, and each sector is further divided into a plurality of frames. At the start of each frame, a frame synchronization pattern including a prescribed bit pattern and a synchronization ID pattern unique to the respective frame is located. After the frame synchronization pattern, a bit pattern obtained by modulating the recording data in accordance with a prescribed modulation rule is recorded and is represented by a combination of 2T through 8T.

The optical disc according to this embodiment is structured such that the spatial frequency of the shortest bit length 2T is 1.12 times of the OTF cutoff frequency as shown in FIG. 22.

The frame synchronization pattern includes 3T/9T/9T and a synchronization ID pattern having a prescribed length. The frame synchronization pattern is distinguishable by using 9T, which is not included in the bit pattern obtained by modulating the recording data. 3T/9T/9T is detected and the synchronization ID pattern after 3T/9T/9T are determined, and thus the frame number of the frame which is being reproduced can be determined.

The run-in area has a length of 2640T, and a prescribed bit pattern is recorded therein.

FIG. 10, FIG. 11, FIG. 12 and FIG. 13 each show repeat bit patterns for the run-in area. The run-in bit pattern in the conventional optical disc is 2T/2T/3T/3T/6T/6T having a total length of 22T as shown in FIG. 24, and this bit pattern is recorded 120 times in repetition in the run-in area.

However, as shown in FIG. 22, when the spatial frequency of the shortest bit length 2T is higher than the OTF cutoff frequency, the amplitude of the 2T part is not obtained as shown in FIG. 24 by the conventional run-in bit pattern. As a result, the PLL or PRML control performed at the time of reproduction is made unstable. Therefore, a bit pattern including 2T is not desirable.

The bit patterns shown in each of FIGS. 10 through 13 do not include 2T corresponding to a spatial frequency higher than the OTF cutoff frequency and includes 3T through 8T corresponding to a spatial frequency lower than the OTF cutoff frequency. Owing to this, the PLL or PRML control performed at the time of reproduction can be made stable with certainty.

When a bit pattern including a 5T or longer pattern, at which the maximum amplitude of a reproduction signal is obtained, is used as shown in FIG. 23, the reproduction signal amplitude control can be appropriately performed at the time of reproduction.

The bit pattern combinations shown in FIG. 11 have a length of 22T like the bit pattern of the conventional optical disc. The bit pattern combinations shown in FIG. 10 have a length of 20T, which is a divisor of 2640T, i.e., the length of the run-in area. The bit pattern combinations shown in FIG. 12 and FIG. 13 have a length of 30T, which is also a divisor of 2640T. The lengths of the bit patterns are different but are all divisors of the length of the run-in area. Therefore, the length of one block including the data area is not changed and thus the compatibility with the recording format of the conventional optical disc can be easily obtained.

As shown in each of FIGS. 10 through 13, there are a plurality of usable bit patterns. For reproducing recorded data, reproduction signal amplitude control, PLL locking control and adaptive equalization locking control each need to be stably performed. For the amplitude control, it is preferable that the maximum amplitude is obtained at a high frequency. For the PLL locking control, it is preferable that short mark/short space combinations appear at a high frequency because the gain is obtained more easily when the number of change points of the reproduction signal is larger. For the adaptive equalization locking control, it is preferable that the equalization levels shown in FIG. 23 are obtained at a uniform frequency in order to appropriately converge the equalized states. Especially in the case of a high recording density at which the shortest mark/space corresponds to a spatial frequency higher than the OTF cutoff frequency, the adaptive equalization technology is indispensable. In order to stably reproduce the recorded data, adaptive equalization locking control is important. In order to fulfill the above conditions at a good balance, a bit pattern, in which the frequency of appearance of three sets of bit lengths, i.e., 3T, 4T through 5T, and 6T through 8T, is substantially uniform, and the mark length and the space length are equal to make the DC component zero, is desirable.

Especially, No. 30T-30 and No. 30T-36 respectively shown in FIGS. 12 and 13 are effective bit patterns which fulfill the above conditions well.

Namely, in the case of the bit pattern of No. 30T-30, a mark and a space as long as 8T are provided. Therefore, the amplitude control can be performed stably and at high speed. In addition, short marks/spaces and long marks/spaces are provided substantially uniformly. Therefore, the PLL locking and the adaptive equalization locking can be performed stably and at high speed.

In the case of the bit pattern of No. 30T-36, 5T, at which the maximum amplitude is obtained, is included. Therefore, the amplitude control can be performed at higher respondability.

According to these bit pattern, high-speed and stable amplitude control, PLL locking and adaptive equalization locking can be easily realized when the recording data at the start of a zone, immediately before which no data is recorded, is reproduced. For example, it is not necessary to record dummy data for locking at the start of the recording data, and so such a loss in the recording capacity can be avoided.

By the bit pattern of No. 30T-36, the maximum amplitude is obtained at a high frequency. Therefore, the envelope of the reproduction signal can be detected easily. It is not incorrectly determined whether data is recorded or not recorded in a block of interest. This makes it possible to put the operation of amplitude control, PLL locking and adaptive equalization locking on hold in an unrecorded zone and to start the operations immediately at the start of the data-recorded zone. For reproducing the recording data at the start of a zone, immediately before which no data is recorded, a sufficient zone for locking control can be obtained.

In the above-described embodiment, the bit patterns shown in FIGS. 10 through 13 include bit lengths in the order from a shorter length to a longer length. The order is not limited to this, and may be different.

In the above-described embodiment, the bit patterns having a length of 20T, 22T or 30T are provided. The present invention is not limited to these. Substantially the same effect is provided as long as the bit pattern has a length which is a divisor of the length of the run-in area.

Embodiment 6

In this embodiment, an existing BD and an optical disc having a higher recording density than that of the BD (hereinafter, referred to as a "high density disc") will be described.

FIG. 14(A) shows an example of a BD having a conventional recording density. In this embodiment, the term "conventional recording density" means 25 GB per information recording layer.

In the BD, the laser light wavelength of an optical beam 123 is 405 nm, the numerical aperture (NA) of an objective lens 220 is 0.85, and the length of a recording mark 121 which is shortest (2T) among various lengths of marks 120 on the track 2 is 149 nm.

FIG. 14(B) shows an example of a high density disc. In the high density disc, the recording density is assumed to be 33.4 GB per information recording layer, namely, 1.336 times of the conventional recording density.

Like in the case of the BD, in the high density disc, the laser light wavelength of the optical beam 123 is 405 nm and the numerical aperture (NA) of the objective lens 220 is 0.85. The length of a recording mark 125 which is shortest (2T) among various lengths of marks 124 on the track 2 is 111.5 nm, which is shorter than the shortest recording mark 121 of the BD. Owing to this, a higher recording density than that of the BD is realized.

Now, the OTF cutoff frequency of the BD and the high density disc will be described.

Where the three parameters, i.e., the laser light wavelength $\lambda$ (405 nm±5 nm, i.e., 400 through 410 nm), the numerical aperture NA (0.85±0.01, i.e., 0.84 through 0.86), and the length P of the shortest mark+the shortest space (in the case of 17 modulation, P=2T+2T=4T) are used, when the reference T decreases to fulfill P<$\lambda$/2NA, the OTF cutoff frequency is exceeded.

The reference T corresponding to the OTF cutoff frequency when NA=0.85 and $\lambda$=405 is:

$$T=405/(2\times 0.85)/4=59.558 \text{ nm}.$$

With the laser light wavelength and the numerical aperture which are the same as those of the BD, the recording capacity at which the spatial frequency of the shortest recording mark exceeds the OTF cutoff frequency is about 31 GB. The recording capacity of the BD is smaller than this value, and so the OTF cutoff frequency is not exceeded. By contrast, the recording capacity of the high density disc shown in FIG. 14(B) exceeds this value, and so the OTF cutoff frequency is exceeded. Thus, it is understood that the data structure of the run-in area according to the present invention described so far is very useful for the high density disc.

Figure 15:
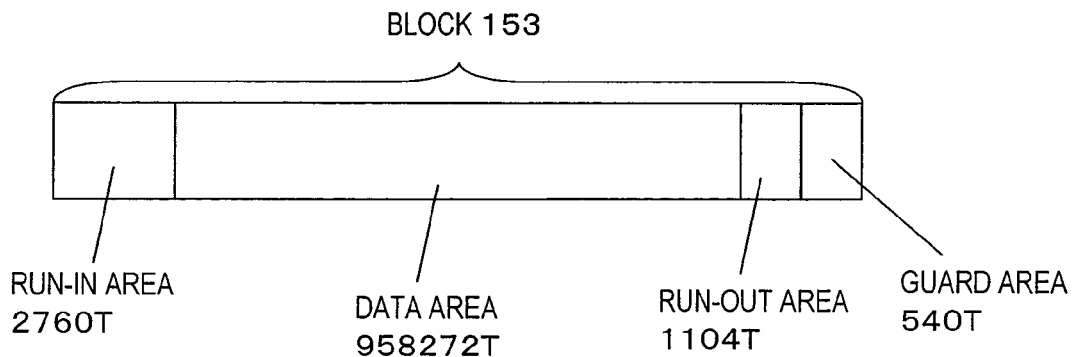
FIG. 15 shows a format of a block 153 of a BD.

FIG. 15 shows a format of a block 153 of the BD.

The block of the BD includes a run-in area, a data area, a run-out area and a guard area in this order.

The run-in area is located immediately before the data area, and a prescribed bit pattern is recorded therein. The run-in area has a length of 2760T.

In the BD, user data as a recording target is divided by in units of 64 kB, and a modulation signal obtained by performing prescribed error correction coding processing and modulation processing (1-7 modulation) on each divided unit is generated. In the data area, marks corresponding to such a modulation signal are recorded. The data area has a length of 958272T.

The run-out area is located immediately after the data area, and a prescribed bit pattern is recorded therein. The run-out area has a length of 1104T.

The guard area is not added to any block in the middle of a series of blocks which are being continuously recorded. The guard area is located immediately after the run-out area of the block located at the end of the recording, and a prescribed bit pattern is recorded therein. The guard area has a length of 540T.

Figure 16:
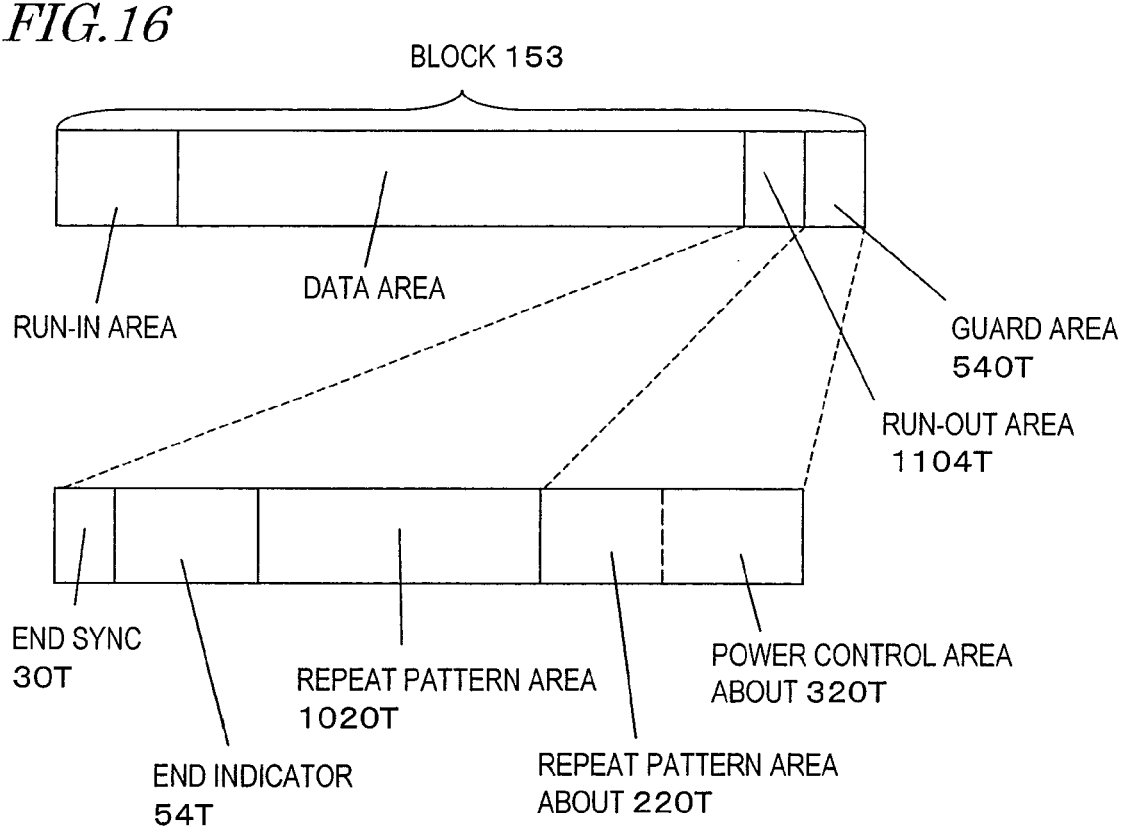
FIG. 16 shows patterns of a run-out area and a guard area of the block 153 in detail.
Figure 17:
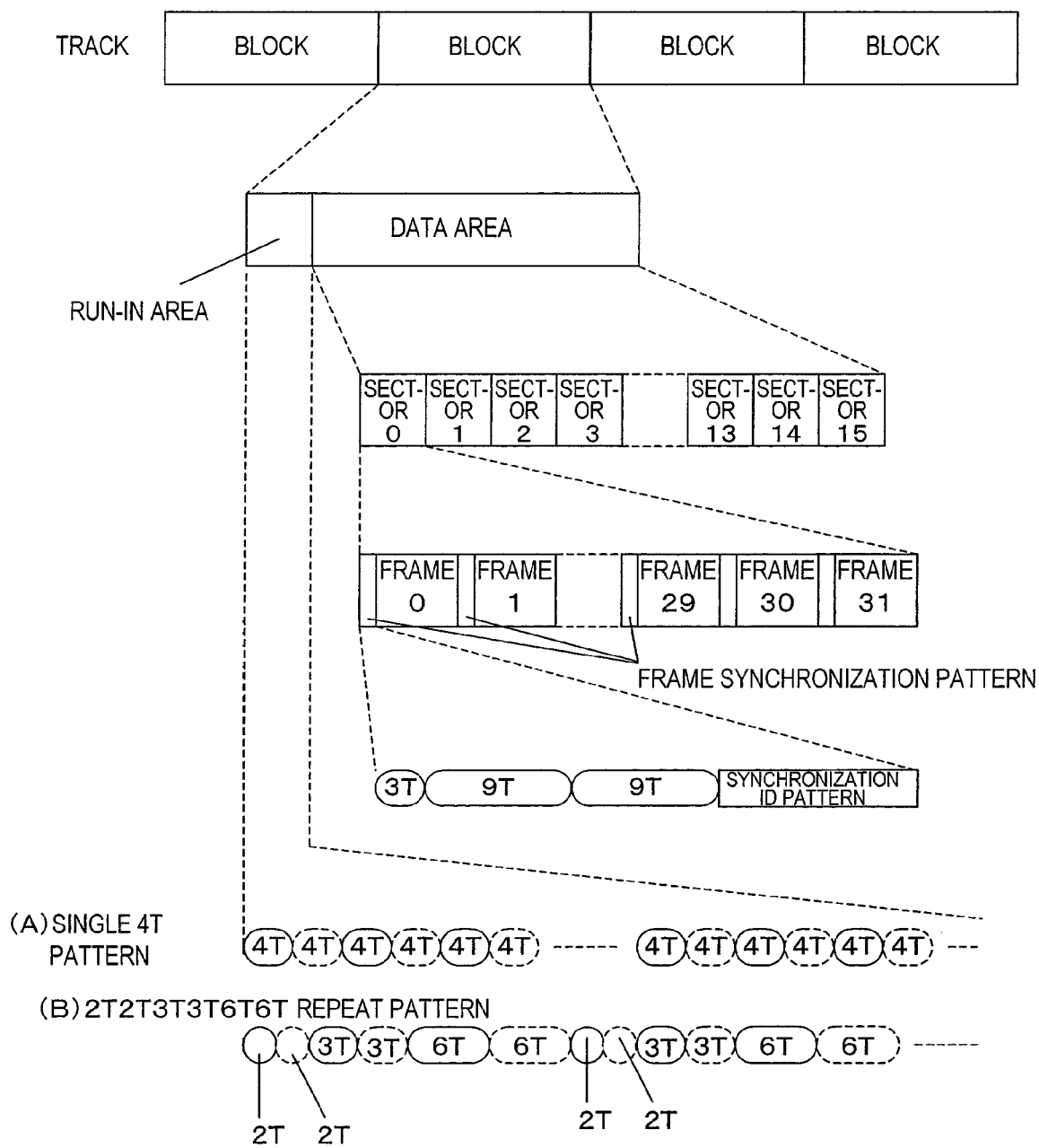
FIG. 17 shows an example of a conventional recording format.

FIG. 16 shows the patterns of the run-out area and the guard area of the block 153 in detail.

The run-out area includes an end SYNC area, an end indicator area, and a repeat pattern area.

In the end SYNC area, a 30T-long SYNC pattern is recorded like in the data area. The SYNC pattern has a length of 30T.

The end indicator area indicates that the data area is terminated. In the end indicator area, 9T is recorded six times in repetition, and the end indicator area has a length of 54T.

In the repeat pattern area, the same repeat pattern as that in the run-in area is recorded. The repeat pattern area has a length of 1020T.

The guard area includes a repeat pattern area and a power control area.

In the repeat pattern area, the same repeat pattern as that in the run-in area is recorded so as to be continued from the end of the repeat pattern of the immediately previous run-out area. The repeat pattern area has a length of about 220T.

The power control area is usable for power control performed at the time of termination of recording. The pattern to be recorded in the power control is not specifically defined. The power control area has a length of about 320T.

As described above, the same repeat pattern as that in the run-in area is recorded both in the run-out area and the guard area. Accordingly, for example, where the repeat patterns of the run-in area shown in FIG. 6 are adopted, the run-in area, the run-out area and the guard area can be each identified with certainty.

In the above-described embodiments, the shortest bit length is 2T, and the spatial frequency of 2T exceeds the OTF cutoff frequency because of an increase of the recording density. The reproduced waveform and the like in such a case are provided. The present invention is not limited to these.

In the above-described embodiments, an example in which the spatial frequency of only 2T exceeds the OTF cutoff frequency is provided. The present invention is also effective to an optical disc in which the spatial frequency of a plurality of bit lengths including the shortest bit length exceeds the OTF cutoff frequency. In such a case, a pattern including bit lengths corresponding to a spatial frequency not exceeding the OTF cutoff frequency may be used as the run-in bit pattern used for the run-in area.

In the above-described embodiments, a recordable optical disc and an optical disc apparatus for such an optical disc are explained as an example. Substantially the same effects are provided for a reproduction-only optical disc and an optical disc apparatus for such an optical disc.

The elements of the optical disc apparatus according to the present invention can be implemented as an LSI, which is an integrated circuit. The elements of the optical disc apparatus may be individually formed as a one-chip device, or a part or the entirety thereof may be incorporated into a one-chip device.

Here, the integrated circuit is referred to as an LSI. The integrated circuit may be referred to as an IC, LSI, super LSI, or ultra LSI depending on the degree of integration.

The integrated circuit of the present invention is not limited to an LSI, and may be implemented as a dedicated circuit or a general purpose processor. An FPGA (Field Programmable Gate Array) which is programmable after the production of an LSI or a reconfigurable processor in which the circuit cell connection or setting in the LSI is reconfigurable may be used.

When another circuit integration technology replacing the LSI appears by the development of the semiconductor technologies or by derivation from the semiconductor technologies, such a technology may be used to integrate the functional blocks. Application of biotechnology or the like is one possibility.

Finally, a brief supplemental explanation will be given regarding a BD (Blu-ray disc) as an example of optical disc according to the present invention. The main optical constants and physical formats of a Blu-ray disc are disclosed in "Blu-ray Disc Dokuhon" (Blu-ray Handbook) published by Ohmsha, Ltd. or the white papers put on the web site of the Blu-ray Association (http://www.blu-raydisc.com/)

For the BD, laser light having a wavelength of 405 nm (where the tolerable error range is ±5 nm, 400 to 410 nm) and an objective lens having NA=0.85 (where the tolerable error range is ±0.01, 0.84 to 0.86) are used. The track pitch is 0.32 μm. The channel clock frequency is 66 MHz (66.000 Mbits/s) at the BD standard transfer rate (1×), 264 MHz (264.000 Mbits/s) at the BD4X transfer rate, 396 MHz (396.000 Mbits/s) at the BD6X transfer rate, and 528 MHz (528.000 Mbits/s) at the BD8X transfer rate. The standard linear velocity (reference linear velocity, 1×) is 4.917 m/sec.

The thickness of a protective layer (cover layer) is decreased as follows as the numerical aperture is increased and so the focal distance is shortened. The thickness of the protective layer is also decreased in order to suppress the influence of a spot distortion caused by a tilt. In contrast to 0.6 mm in the case of a DVD, the thickness of the protective layer of a BD may be 10 to 200 μm among the total thickness of the medium of about 1.2 mm (more specifically, where the substrate has a thickness of about 1.1 mm, a transparent protective layer having a thickness of about 0.1 mm is provided in a single layer disc, and a protective layer having a thickness of about 0.075 mm and a spacer layer having a thickness of about 0.025 mm are provided in a two layer disc). In a disc including three or more layers, the thickness of the protective layer and/or the spacer layer is further decreased.

In order to protect such a thin protective layer against being damaged, a projection may be provided outside or inside a clamp area. Especially where the projection is provided inside the clamp area, the following advantages are provided in addition to protecting the protective layer against being damaged. Since the projection is close to the central hole of the disc, the load on the rotation spindle (motor), which would be otherwise caused due to the weight balance of the projection, can be alleviated, and the collision of the projection and the optical head can be avoided because the optical head accesses the information recording area outside the clamp area.

Where the projection is provided inside the claim area, the specific position of the projection may be as follows, for example, in a disc having an outer diameter of 120 mm. Where the central hole has a diameter of 15 mm and the clamp area is provided in a region from a diameter of 23 mm to a diameter of 33 mm, the projection is provided between the central hole and the clamp area, namely, in a region from a diameter of 15 mm to a diameter of 23 mm. In this case, the projection may be provided at a position a certain distance away from the central hole (for example, the projection may be separated from the edge of the central hole by equal to or more than 0.1 mm (or/and equal to or less than 0.125 mm)). Alternatively, the projection may be provided at a position a certain distance away from the clamp area (for example, the projection may be separated from the inner end of the clamp area by equal to or more than 0.1 mm (or/and equal to or less than 0.2 mm)). Still alternatively, the projection may be provided at a position a certain distance away both from the edge of the central hole and the inner end of the clamp area (specifically, the projection may be provided in a region from a diameter of 17.5 mm to a diameter of 21.0 mm). The height of the projection may be determined such that the protective layer is unlikely to be damaged or the disc is easily raised in terms of balance. If the projection is excessively high, another problem may arise. Hence, for example, the height of the projection may be equal to or less than 0.12 mm from the clamp area.

The stacking structure of the layers may be as follows. In the case of, for example, a one-sided disc used for information reproduction and/or recording with laser light incident on the side of the protective layer, where there are two or more recording layers, there are a plurality of recording layers between the substrate and the protective layer. The multi-layer structure in such a case may be as follows, for example. A reference layer (L0 layer) is provided at the position which is farthest from the light incidence surface and is away from the light incidence surface by a prescribed distance. Other layers (L1, L2, . . . Ln) are stacked on the reference layer toward the light incidence surface while the distance from the light incidence surface to the reference layer is kept the same as the distance from the light incidence surface to the recording layer in a single-layer disc (for example, about 0.1 mm). By keeping the distance to the farthest layer the same regardless of the number of layers in this manner, the following effects are provided. The compatibility can be maintained regarding the access to the reference layer. In addition, although the farthest layer is most influenced by the tilt, the influence of the tilt on the farthest layer is prevented from being increased as the number of layers increases. The reason is that the distance to the farthest layer is not increased even if the number of layers increases.

Regarding the spot advancing direction/reproduction direction, either the parallel path or the opposite path is usable, for example. By the parallel path, the spot advancing direction/reproduction direction is the same in all the layers, namely, is from the innermost end toward the outermost end in all the layers, or from the outermost end toward the innermost end in all the layers. By the opposite path, where the spot advancing direction/reproduction direction is from the innermost end toward the outermost end in the reference layer (L0), the spot advancing direction/reproduction direction is from the outermost end toward the innermost end in L1 and is from the innermost end toward the outermost end in L2. Namely, the reproduction direction is from the innermost end toward the outermost end in Lm (m is 0 or an even number) and is from the outermost end toward the innermost end in Lm+1 (or is from the outermost end toward the innermost end in Lm (m is 0 or an even number) and is from the innermost end toward the outermost end in Lm+1). In this manner, the reproduction direction may be opposite between adjacent layers.

Now, the modulation system of the recording signal will be briefly described. For recording data (original source data/pre-modulation binary data) on a recording medium, the data is divided into parts of a prescribed size, and the data divided into parts of the prescribed size is further divided into frames of a prescribed length. For each frame, a prescribed sync. code/synchronization code stream is inserted (frame sync. area). The data divided into the frames is recorded as a data code stream modulated in accordance with a prescribed modulation rule matching the recording/reproduction signal characteristic of the recording medium (frame data area).

The modulation rule may be, for example, an RLL (Run Length Limited) coding system by which the mark length is limited. The notation "RLL(d,k)" means that the number of 0's appearing between 1 and 1 is d at the minimum and k at the maximum (d and k are natural numbers fulfilling d<k). For example, when d=1 and k=7, where T is the reference cycle of modulation, the length of the mark or space is 2T at the shortest and 8T at the longest. Alternatively, the modulation rule may be 1-7PP modulation, in which the following features [1] and [2] are added to the RLL(1,7) modulation. "PP" of 1-7PP is an abbreviation of Parity preserve/Prohibit Repeated Minimum Transition Length. [1] "Parity preserve" represented by the first "P" means that whether the number of 1's of the pre-modulation source data bits is an odd number or an even number (i.e., Parity) matches whether the number of 1's of the corresponding post-modulation bit pattern is an odd number or an even number. [2] "Prohibit Repeated Minimum Transition Length" represented by the second "P" means a mechanism for limiting the number of times the shortest marks and spaces are repeated on the post-modulation recording wave (specifically, a mechanism for limiting the number of times 2T is repeated to 6).

Here, an area including the synchronization code stream and the data code stream is referred to as a "frame area", and a unit including a plurality of (e.g., 31) frame areas is referred to as an "address unit". In an address unit, an inter-code distance between a synchronization code stream included in an arbitrary frame area of the address unit and a synchronization code stream included in a frame area other than the arbitrary frame area may be 2 or greater. The "inter-code distance" means the number of bits which are different between two code streams. Owing to the arrangement in which the inter-code distance is 2 or greater, even if a 1-bit shift error occurs in one of the streams to be read due to an influence of noise or the like during reproduction, such a stream is not identified as the other stream by mistake. Alternatively, the inter-code distance between a synchronization code stream included in a frame area located at the start of the address unit and a synchronization code stream included in a frame area located at a position other than the start of the address unit may be 2 or greater. Owing to such an arrangement, it is easily distinguished whether the synchronization code stream is at the start or not, or whether the synchronization code stream is at the junction of address units or not.

The term "inter-code distance" encompasses an inter-code distance in an NRZ notation of the code stream in the case of NRZ recording and also an inter-code distance in an NRZI notation of the code stream in the case of NRZI recording. Therefore, in the case of recording performed by the RLL modulation, "RLL" means that the number of continuous high-level or low-level signals on the recording wave of NRZI is limited and so means that the inter-code distance is 2 or greater in the NRZI notation.

Now, the recording system will be described. By forming a groove in a medium, groove parts and inter-groove parts between groove parts are formed. There are various recording systems; namely, data may be recorded in the groove parts, in the inter-groove parts, or both in the groove parts and the inter-groove parts. A system of recording on a convex side as seen from the light incidence surface, among the groove parts and the inter-groove parts, is called "on-groove system", whereas a system of recording on a concave side as seen from the light incidence surface is called "in-groove system". According to the present invention, it is not specifically limited whether the on-groove system is used, the in-groove system is used, or a system of permitting either one of the two systems is used.

In the case of using the system of permitting either one of the two systems, recording system identification information which indicates whether the on-groove system or the in-groove system is used may be recorded on the medium, so that the recording system of the medium, the on-groove system or the in-groove system, can be easily identified. For a multi-layer medium, recording system identification information on each layer may be recorded. In such a case, recording system identification information on all the layers may be recorded on a reference layer (the layer farthest from the light incidence surface (L0), the layer closest to the light incidence surface, the layer to which the optical head is determined to access first after the optical disc apparatus is started, etc.). Alternatively, recording system identification information on each layer may be recorded on the respective layer, or recording system identification information on all the layers may be recorded on each layer.

The areas in which the recording system identification information can be recorded include a BCA (Burst Cutting area), a disc information area (an area which is inner or/and outer to the data recording area and mainly stores control information; in the reproduction-only area, such an area may have a track pitch larger than that of the data recording area), a wobble (recorded in superimposition on the wobble), and the like. The recording system identification information may be recorded in any one of these areas, a plurality of areas among these areas, or all of these areas.

The wobble start direction may be opposite between the on-groove system and the in-groove system. Namely, where the wobble start direction in the on-groove system is from the innermost end toward the outermost end of the disc, the wobble start direction in the in-groove system may be from the outermost end of the disc (alternatively, where the wobble start direction in the on-groove system is from the outermost end of the disc, the wobble start direction in the in-groove system may be from the innermost end of the disc). By setting the wobble start direction to be opposite between the on-groove system and the in-groove system in this manner, the tracking polarity can be the same whichever system, the on-groove system or the in-groove system, may be used. The reason is as follows. In the on-groove system, the recording is made on the convex side as seen from the light incidence side, whereas in the in-groove system, the recording is made on the concave side as seen from the light incidence side. Therefore, if the groove depth is the same in these systems, the tracking polarity is opposite. By setting the wobble start direction to be opposite between the two systems, the tracking polarity can be made the same.

A recording film can have the following two recording characteristics because of the relationship between the reflectance of the recorded part and the reflectance of the unrecorded part. They are HtoL characteristic at which the reflectance of the unrecorded part is higher than the reflectance of the recorded part (High-to-Low), and LtoH characteristic at which the reflectance of the unrecorded part is lower than the reflectance of the recorded part (Low-to-High). According to the present invention, it is not specifically limited whether the HtoL characteristic is used, the LtoH characteristic is used, or either one of the two is permissible as the characteristic of the recording film of the medium.

In the case where either one of the two is permissible, recording film characteristic identification information which indicates whether the recording film has the HtoL characteristic or the LtoH characteristic may be recorded on the medium, so that it can be easily identified which characteristic the recording film has. For a multi-layer medium, recording film characteristic identification information on each layer may be recorded. In such a case, recording film characteristic identification information on all the layers may be recorded on a reference layer (the layer farthest from the light incidence surface (L0), the layer closest to the light incidence surface, the layer to which the optical head is determined to access first after the optical disc apparatus is started, etc.). Alternatively, recording film characteristic identification information on each layer may be recorded on the respective layer, or recording film characteristic identification information on all the layers may be recorded on each layer.

The areas in which the recording film characteristic identification information can be recorded include a BCA (Burst Cutting area), a disc information area (an area which is inner or/and outer to the data recording area and mainly stores control information; in the reproduction-only area, such an area may have a track pitch larger than that of the data recording area), a wobble (recorded in superimposition on the wobble), and the like. The recording film characteristic identification information may be recorded in any one of these areas, a plurality of areas among these areas, or all of these areas.

The present invention is usable for an increased recording density of an optical disc and so is useful, and can be utilized for large capacity optical discs, and optical disc reproducing apparatuses, optical disc recording apparatuses, optical disc reproducing methods, optical disc recording methods, and integrated circuits usable for such optical discs.

What is claimed is:

1. An optical disc, comprising tracks, each divided into a plurality of recording blocks; wherein:
   each of the plurality of blocks includes a run-in area and a data area;
   in the run-in area, a prescribed run-in bit pattern is recordable;
   in the data area, bit patterns having a plurality of bit lengths obtained by modulating data as a recording target in accordance with a prescribed modulation rule are recordable;

at least one of spatial frequencies corresponding to the bit patterns having the plurality of bit lengths in accordance with the prescribed modulation rule is higher than a cutoff frequency;

the cutoff frequency is defined as a frequency at which a gain of an optical transfer function (OTF) is 0 times; and the run-in bit pattern recordable in the run-in area includes the bit patterns having the plurality of bit lengths, from which the bit pattern corresponding to the frequency higher than the OTF cutoff frequency has been excluded.

* * * * *